US012318783B2

(12) United States Patent
Pan et al.

(10) Patent No.: US 12,318,783 B2
(45) Date of Patent: Jun. 3, 2025

(54) PARTICLE SORTING SYSTEMS AND METHODS

(71) Applicant: Orca Biosystems, Inc., Menlo Park, CA (US)

(72) Inventors: Qiong Pan, Menlo Park, CA (US); Colm Hunt, Redwood City, CA (US); Ivan K. Dimov, Mountain View, CA (US)

(73) Assignee: Orca Biosystems, Inc.

( * ) Notice: Subject to any disclaimer, the term of this patent is extended or adjusted under 35 U.S.C. 154(b) by 225 days.

(21) Appl. No.: 17/901,672

(22) Filed: Sep. 1, 2022

(65) Prior Publication Data

US 2023/0166261 A1 Jun. 1, 2023

Related U.S. Application Data

(63) Continuation of application No. PCT/US2021/020712, filed on Mar. 3, 2021.

(Continued)

(51) Int. Cl.
*B01L 3/00* (2006.01)

(52) U.S. Cl.
CPC ... *B01L 3/50857* (2013.01); *B01L 2200/0652* (2013.01); *B01L 2200/12* (2013.01); *B01L 2300/0819* (2013.01); *B01L 2300/165* (2013.01)

(58) Field of Classification Search
CPC ......... B01L 3/50857; B01L 2200/0652; B01L 2200/12; B01L 2300/0819; B01L 2300/165
See application file for complete search history.

(56) References Cited

U.S. PATENT DOCUMENTS

| | | | |
|---|---|---|---|
| 2002/0001546 A1 | 1/2002 | Hunter et al. | |
| 2006/0105453 A1 | 5/2006 | Brenan et al. | |

(Continued)

FOREIGN PATENT DOCUMENTS

| | | |
|---|---|---|
| WO | 2006036307 | 4/2006 |
| WO | 2007/129791 | 11/2007 |

(Continued)

OTHER PUBLICATIONS

Zhang et al., "Developing porous honeycomb films using miktoarm star copolymers and exploring their application in particle separation", Macromolecular rapid communications, pp. 221-227 (2014).

(Continued)

*Primary Examiner* — Jill A Warden
*Assistant Examiner* — Michael Stanley Gzybowski
(74) *Attorney, Agent, or Firm* — SNELL & WILMER L.L.P.

(57) ABSTRACT

Described are systems and methods for particle sorting. An array may comprise a substrate with a first surface and a second surface opposite to the first surface. The substrate may comprise a plurality of pores defining lumens extending from the first surface to the second surface. The plurality of pores can be configured to receive a sample solution comprising a plurality of particles. The array may further comprise a surface material provided at or adjacent to the first or second surfaces. The surface material may comprise a plurality of materials that are configured to modify a wetting behavior of the sample solution or the plurality of particles at or adjacent to said first or second surfaces, such that one of the first or second surfaces is hydrophilic, and the other of the first or second surfaces is hydrophobic.

19 Claims, 31 Drawing Sheets

Related U.S. Application Data

(60) Provisional application No. 62/985,257, filed on Mar. 4, 2020.

(56) References Cited

U.S. PATENT DOCUMENTS

| | | | |
|---|---|---|---|
| 2012/0212733 | A1 | 8/2012 | Kodali et al. |
| 2013/0244001 | A1 | 9/2013 | Wang et al. |
| 2016/0245805 | A1 | 8/2016 | Baer et al. |
| 2019/0212332 | A1 | 7/2019 | Dimov et al. |

FOREIGN PATENT DOCUMENTS

| | | |
|---|---|---|
| WO | 2016/071762 | 5/2016 |
| WO | 2018053485 | 3/2018 |
| WO | 2020047508 | 3/2020 |

OTHER PUBLICATIONS

Abdelsalam et al., "Wetting of regularly structured gold surfaces", Langmuir 21.5 (2005).

Chen et al., "Designing 3D biological surfaces via the breath figure-method", Advanced Healthcare Materials, pp. 1-18 (2018).

Overall performance of coated Au plate vs. Cr plate

| Plate & coating | Extraction yield | Viability of extracted cells by dye exclusion |
|---|---|---|
| Au plate coated with PEG-thiol, PEG silane, Perfluorooctane thiol | 73% | 66% |
| Cr plate coated with PEG-silane | 66% | 68% |

| | Glass-Au | Pore plate-Au |
|---|---|---|
| Bare Au | 60 ± 1.2° | 59 ± 1.7° |
| mPEG-SH | 88 ± 1.7° | 91 ± 2.5° |
| PFSH | 132 ± 2.8° | 110 ± 3.7° |

PARTICLE SORTING SYSTEMS AND METHODS

CROSS REFERENCE

This application is a continuation of PCT/US2021/020712, filed Mar. 3, 2021, which claims the benefit of U.S. Provisional Patent Application No. 62/985,257, filed on Mar. 4, 2020, both of which are incorporated herein by reference in their entirety for all purposes.

BACKGROUND

Cell-based therapies represent a cornerstone of regenerative medicine and immunotherapies. While many of the non-therapeutic cells that carry over into the therapy are harmless, even a small population of a specific errant cell type can cause severely adverse consequences in the patient. Therefore, it can be critical to purify the therapeutic cells away from the deleterious cells before transplanting the cells into a patient. To accelerate the translation of cell-based regenerative medicine techniques into the clinic, high-throughput, high-purity methods to isolate rare stem cells and other immune cell types based on differential surface marker expression in a sterile and clinically applicable format can be necessary.

SUMMARY

Embodiments disclosed herein provide systems, methods, and devices for sorting cells. In some instances, the cells can be sorted with aid of lasers (e.g., laser extraction) and/or micropore arrays. The micropore arrays can comprise a coating that can interact with the lasers to aid in extraction of cells of interest. The coating can in some instances peel off and concurrently disrupt a meniscus of a liquid held in the micropore array. Advantageously, the approaches described herein can increase cell viability and extraction efficiency, for example, as lasers are directed to surfaces of the array rather than directly at the liquid holding the particles of interest.

In some aspects, the disclosure provides an array, the array comprising a substrate with a first surface and a second surface opposite the first surface, wherein the substrate comprises a substrate material and a surface material wherein the surface material is positioned at or adjacent to the first or second surfaces, and the substrate comprises a plurality of pores defining lumens extending from the first surface to the second surface and wherein the substrate is characterized by: each pore of the plurality of pores has a largest diameter of 500 microns or less, each pore of the plurality of pores has an aspect ratio of 5 or greater, and the surface material is selected from a material that absorbs greater than 10 percent of incident electromagnetic radiation.

In some aspects, the disclosure provides an array comprising: a substrate with a first surface and a second surface opposite the first surface, wherein the substrate comprises a substrate material and a surface material wherein the surface material is positioned at or adjacent to the first or second surfaces, and the substrate comprises a plurality of pores extending from the first surface to the second surface and wherein the substrate is characterized by: a pore density of 100 or greater pores per square millimeter, each pore of the plurality of pores has an aspect ratio of 10 greater, and the surface material is selected from a material that absorbs greater than 10 percent of incident electromagnetic radiation.

In certain embodiments, each pore has a largest cross-sectional area of about 0.008 $mm^2$ or less. In certain embodiments, each pore of the plurality of pores has a pore diameter within a range from 5 microns to 100 microns. In certain embodiments, each pore of the plurality of pores has a pore diameter within a range from 15 microns to 50 microns. In certain embodiments, each pore has a length selected range from about 1 mm to about 500 mm. In certain embodiments, each pore has a length selected from a range from about 1 mm to about 100 mm. In certain embodiments, each pore has a length selected from a range from about 0.1 mm to about 10 mm.

In certain embodiments, the pore density is within a range from 100 to 2500 pores per square millimeter. In certain embodiments, the pore density is within a range from 500 to 1500 pores per square millimeter. In certain embodiments, the surface material is substantially similar to the substrate material. In certain embodiments, the surface material is different than the substrate material. In certain embodiments, the substrate material is glass and the surface material is not glass. In certain embodiments, the surface material comprises a metal. In certain embodiments, the surface material absorbs greater than 10 percent of incident electromagnetic radiation of a wavelength selected from 0.4 microns to 2.5 microns. In certain embodiments, the surface material absorbs greater than 50 percent of incident radiation. In certain embodiments, the surface material absorbs greater than 50 percent of incident electromagnetic radiation of a wavelength selected from 0.4 microns to 1.5 microns.

In certain embodiments, the aspect ratio is within a range from 5 to 100. In certain embodiments, the aspect ratio is 20 or greater. In certain embodiments, the aspect ratio is 50 or greater. In certain embodiments, the aspect ratio is 100 or greater. In certain embodiments, the surface material coats or partially coats the second surface. In certain embodiments, the surface material coats or partially coats the first surface. In certain embodiments, the surface material does not block access to the lumens of the pores. In certain embodiments, the surface material has an average thickness of about 20 nm to 500 nm. In certain embodiments, the surface material has an average thickness of about 100 nm to 500 nm. In certain embodiments, the surface material is hydrophobic.

In certain embodiments, the first and second surfaces are substantially parallel planes. In certain embodiments, the plurality of pores extends at an angle relative to a surface normal from the first surface to the second surface. In certain embodiments, the angle is greater within a range from zero to ninety degrees. In certain embodiments, the plurality of pores extends orthogonally from the first surface to the second surface. In certain embodiments, the plurality of pores traverses an indirect path from the first surface to the second surface.

In some aspects, the present disclosure provides a system for sorting components of a mixture, comprising the array of any aspect of the present disclosure and a housing comprising an internal surface configured to receive selected contents released from the array. In certain embodiments, the internal surface is positioned below the second surface of the substrate.

In some aspects, the present disclosure provides a method of releasing selected contents from a pore of an array, the method comprising: identifying a pore of an array with selected contents, wherein the array comprises a substrate with a first surface and a second surface opposite the first surface, wherein the substrate comprises a substrate material and a surface material wherein the surface material is positioned at or adjacent to the first or second surfaces, and the substrate comprises a plurality of pores defining lumens extending from the first surface to the second surface, wherein the substrate is characterized by one or more of: (a) each pore of the plurality of pores has a largest diameter of 500 microns or less, (b) each pore of the plurality of pores has an aspect ratio of 5 or greater, (c) a pore density of 100 or greater pores per square millimeter, and (d) the surface material is selected from a material that absorbs greater than 10 percent of incident electromagnetic radiation, and removing a portion of the surface material from the first or second surface of the array with electromagnetic radiation directed to the surface material within or adjacent to the identified pore, thereby releasing the contents of the identified pore.

In certain embodiments, the electromagnetic radiation is selected from a wavelength of 0.2 microns to 2.5 microns, a fluence level sufficient to disrupt adhesion between the contents and the pore, and a pulse duration in a range from 1 ns to 1 millisecond. In certain embodiments, removing surface material comprises ablation. In certain embodiments, removing surface material comprises mechanical removal. In certain embodiments, mechanical removal comprises chipping. In certain embodiments, removing surface material comprises photothermal removal. In certain embodiments, removing surface material comprises photochemical removal. In certain embodiments, removing surface material comprises photoacoustic removal.

In certain embodiments, the selected contents comprise cells in an aqueous solution. In certain embodiments, the cells are selected from INKT cells, Tmem, Treg, HSPCs, and combinations thereof. In certain embodiments, each pore of the plurality of pores has a cross-sectional area each of about 0.008 $mm^2$ or less. In certain embodiments, each pore of the plurality of pores has a pore diameter within a range from 5 microns to 100 microns. In certain embodiments, each pore of the plurality of pores has a pore diameter within a range from 15 microns to 50 microns. In certain embodiments, each pore has a length selected range from about 1 mm to about 500 mm. In certain embodiments, each pore has a length selected from a range from about 1 mm to about 100 mm. In certain embodiments, each pore has a length selected from a range from about 0.1 mm to about 10 mm.

In certain embodiments, the pore density is within a range from 100 to 2500 pores per square millimeter on an array. In certain embodiments, the pore density is within a range from 500 to 1500 pores per square millimeter of an array. In certain embodiments, the array comprises a pore density of greater than 1000 pores/$mm^2$. In certain embodiments, pore density is 5000 pores/$mm^2$ or greater. In certain embodiments, the aspect ratio is within a range from 5 to 100. In certain embodiments, the pores have an aspect ratio of 20 or greater. In certain embodiments, the pores have an aspect ratio of 50 or greater. In certain embodiments, the pores have an aspect ratio of 100 or greater. In certain embodiments, the surface material absorbs greater than 10 percent at a wavelength selected from about 0.4 micron to about 2.5 micron. In certain embodiments, the surface material absorbs of greater than 50 percent of incident radiation. In certain embodiments, the surface material absorbs greater than 50 percent of incident radiation at a wavelength selected from about 0.4 micron to about 2.5 micron.

In certain embodiments, the array is characterized by two or more of: (a) each pore of the plurality of pores has a largest diameter of 500 microns or less, (b) each pore of the plurality of pores has an aspect ratio of 5 or greater, (c) a pore density of 100 or greater pores per square millimeter, and (d) the surface material is selected from a material that absorbs greater than 10 percent of incident electromagnetic radiation. In certain embodiments, the portion of the surface material is adjacent to the identified pore. In certain embodiments, the portion of the surface comprises a luminal surface of the identified pore. In certain embodiments, the portion of the surface is removed to a depth of 100 microns or less. In certain embodiments, the portion of the surface is removed to a depth of 50 microns or less. In certain embodiments, the method further comprises loading the array with a solution comprising the selected contents prior to the identifying the pore with selected contents. In certain embodiments, identifying the pore with selected contents comprises analyzing emitted electromagnetic radiation from the pores of the array. In certain embodiments, releasing the contents comprises releasing the contents at a rate of about 5,000 to about 100,000,000 pores per second.

In some aspects, the present disclosure provides a bead comprising: an infrared absorbing core; and a non-infrared absorbing shell, wherein an external diameter of the non-infrared absorbing shell is equal to or less than about 10 microns.

In certain embodiments, the non-infrared absorbing shell comprises agarose, dextran, or both. In certain embodiments, the infrared absorbing core comprises an infrared absorbing dye. In certain embodiments, the bead has a diameter equal to or less than about 20 microns.

In some aspects, the present disclosure provides a solution comprising: a plurality of the beads of any aspect of the present disclosure; and a particle of interest. In certain embodiments, the particle of interest is a cell. In certain embodiments, a ratio of a number of the plurality of the beads to a number of a plurality of the cells is about 1:1 to 10:1.

In another aspect of the disclosure, an array comprises a substrate with a first surface and a second surface opposite to the first surface, wherein the substrate comprises a plurality of pores defining lumens extending from the first surface to the second surface, and wherein the plurality of pores are configured to receive a sample solution comprising a plurality of particles; and a surface material provided at or adjacent to the first or second surfaces, wherein the surface material comprises a plurality of materials that are configured to modify a wetting behavior of the sample solution or the plurality of particles at or adjacent to said first or second surfaces, such that one of the first or second surfaces is hydrophilic, and the other of the first or second surfaces is hydrophobic.

In some embodiments, the plurality of materials comprises a metal layer (such as sputtered, physically sputtered, chemically coated, functionally modified (i.e., surface hydrophilicity modified, surface hydrophobicity modified), etc.). The metal layer may have a thickness within a range of about 50 nm to about 1 mm. The metal layer may comprise titanium and/or gold. A first portion of the metal layer may be coated with a first chemical coating. A second portion of the metal layer may be coated with a second chemical coating that is different from the first chemical coating. In some embodiments, the first chemical coating may be provided on vertical sidewalls of the plurality of pores at or adjacent to the first or second surfaces. The first chemical coating can be configured to reduce or eliminate sticking of the particles to the vertical sidewalls of the pores. The second chemical coating can be configured to reduce or prevent unwanted leakage of the sample solution from the pores. In some embodiment, the second chemical coating is hydrophobic. The second chemical coating may be provided on a portion of the substrate that is at or adjacent to the first or second surfaces. The portion of the substrate may be adjacent to vertical sidewalls of the plurality of pores. In some instances, the portion of the substrate may be substantially orthogonal to the vertical sidewalls of the plurality of pores.

In some embodiments, the first chemical coating may comprise Methoxy-Poly (Ethylene-glycol)-Thiol. The second chemical coating may comprise 1H,1H,2H,2H-Perfluorodecanethiol.

In some embodiments, the plurality of materials further comprises a chemical coating that is not on the metal layer (such as sputtered, physically sputtered, chemically coated, functionally modified (i.e., surface hydrophilicity modified, surface hydrophobicity modified), etc.). The chemical coating may be provided on one or more portions of the substrate or the plurality of pores that does not have the metal layer (such as sputtered, physically sputtered, chemically coated, functionally modified (i.e., surface hydrophilicity modified, surface hydrophobicity modified), etc.). In some embodiments, the chemical coating comprises Methoxy-Poly (Ethylene-glycol)-Silane.

In some embodiments, the second surface can be configured to receive the sample solution comprising the plurality of particles. The first surface can be configured to be disrupted to release one or more of the particles from one or more of the pores. In some embodiments, the second surface may be hydrophilic to enhance absorption of the sample solution comprising the plurality of particles into the plurality of pores. The first surface may be hydrophobic to reduce or eliminate unwanted leakage of the sample solution from the pores.

In some embodiments, the first surface can be configured to be disrupted by directing electromagnetic radiation at one or more portions of the second surface. In some embodiments, each pore of the plurality of pores has a largest diameter of 500 microns or less. Each pore of the plurality of pores may have an aspect ratio of 5 or greater. The surface material may be selected from a material that absorbs greater than 10 percent of incident electromagnetic radiation. The substrate may have a pore density of 100 or greater pores per square millimeter.

In some embodiments, a particle extraction yield of the array is at least 70%. A particle extraction yield of the array having a functionally modified surface layer (i.e., the chemically coated metal layer) (i.e., surface hydrophilicity modified, surface hydrophobicity modified) can be higher than another array without the functionally modified surface layer (i.e., the chemically coated metal layer) (i.e., surface hydrophilicity modified, surface hydrophobicity modified). For example, the particle extraction yield of the array having the functionally modified surface layer (i.e., the chemically coated metal layer) (i.e., surface hydrophilicity modified, surface hydrophobicity modified) can be at least 5% higher than the another array without the functionally modified surface layer (i.e., the chemically coated metal layer) (i.e., surface hydrophilicity modified, surface hydrophobicity modified). In some cases, the particle extraction yield of the array having the functionally modified surface layer (i.e., the chemically coated metal layer) (i.e., surface hydrophilicity modified, surface hydrophobicity modified) is at least 20% higher than the another array without the functionally modified surface layer (i.e., the chemically coated metal layer) (i.e., surface hydrophilicity modified, surface hydrophobicity modified).

In some embodiments, the plurality of particles comprise live cells. A live cell extraction yield of the array having the functionally modified surface layer (i.e., the chemically coated metal layer) (i.e., surface hydrophilicity modified, surface hydrophobicity modified) can be higher than another array without the functionally modified surface layer (i.e., the chemically coated metal layer) (i.e., surface hydrophilicity modified, surface hydrophobicity modified). For example, the live cell extraction yield of the array having the functionally modified surface layer (i.e., the chemically coated metal layer) (i.e., surface hydrophilicity modified, surface hydrophobicity modified) can be at least 5% higher than the another array without the functionally modified surface layer (i.e., the chemically coated metal layer) (i.e., surface hydrophilicity modified, surface hydrophobicity modified). In some cases, the live cell extraction yield of the array having the functionally modified surface layer (i.e., the chemically coated metal layer) (i.e., surface hydrophilicity modified, surface hydrophobicity modified) is at least 20% higher than the another array without the functionally modified surface layer (i.e., the chemically coated metal layer) (i.e., surface hydrophilicity modified, surface hydrophobicity modified).

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

A need exists to provide cell sorting systems with high speeds and sterility. Accordingly, provided herein are systems, devices, and methods for sorting cells through laser extraction from arrays, such as micropore arrays. The micropore sorting employed by the systems, devices, and methods herein can be configured for high sorting rates of about 10,000 cells/second, or 100-1000 fold faster than that of the state of the art. Further, the embodiments described herein can enable such sorting rates without jeopardizing cell viability or function, while maintaining sterility and operator biosafety, reducing sample-to-sample contamination, and eliminating any flow-rate time-constraints. In particular, the surface materials of the micropore arrays, and systems and methods of use thereof, allow for release of pore contents with negligible thermal impact on pore contents. Various systems and methods of the present disclosure may be combined or modified with other systems and methods, such as, for example, those described in International Patent Application No. PCT/US2019/049221 titled "ULTRAFAST PARTICLE SORTING," which is incorporated herein by reference in its entirety.

Array

Provided herein is an array. An array as described herein can be utilized for sorting particles. The particles can be particles of interest, such as cells that need to be enriched for therapeutic use. The array can comprise a substrate. The substrate can comprise a first surface, e.g., a top surface, a second surface, e.g., a bottom surface, opposite of the first surface, and a plurality of pores extending from the first surface to the second surface. The pores may define lumens, which may have varying shapes as described herein. The pores may be micropores or microchannels.

In one non-limiting example, a substrate comprising a plurality of pores may be characterized by each pore having a largest diameter of 500 microns or less, each pore having an aspect ratio of 10 or greater, and a surface material selected from a material that absorbs greater than 10 percent of incident electromagnetic radiation. In an additional or alternative non-limiting example, a substrate comprising a plurality of pores may be characterized by a pore density of 100 or greater pores per square millimeter, each pore having an aspect ratio of 10 or greater, and the surface material selected from a material that absorbs greater than 10 percent of incident electromagnetic radiation.

Figure 1A:
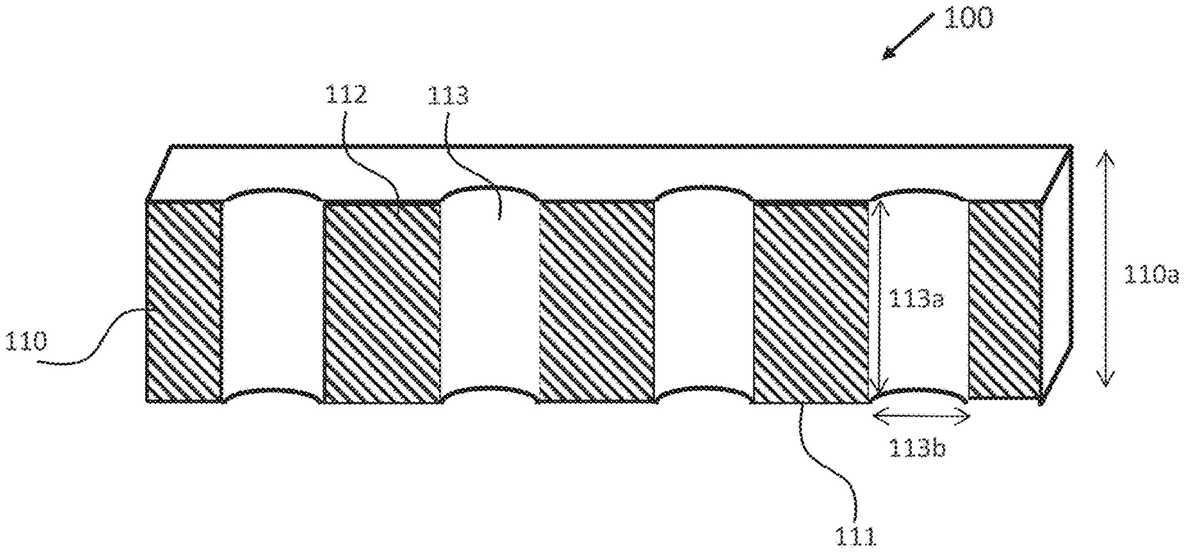
FIG. 1A is a side cross-sectional view of an array for sorting cells, in accordance with some embodiments.

FIG. 1A is a vertical cross-section of an array for sorting particles, in accordance with some embodiments. As shown in FIG. 1A, the array 100 may comprise substrate 110 comprising (a) a first surface 111 and a second surface 112 opposite the first surface 111, and (b) a plurality of pores 113 extending from the first surface 111 to the second surface 112. The plurality of pores may be substantially parallel to one another and may be configured to hold the particles together with liquid. For example, the liquid can be held within the pores via surface tension, and can in some instances form a meniscus at one or both ends of each pore.

Substrate 110 may comprise a substrate material. The substrate material may be glass, such as a silicate glass, fused silica, fused quartz, etc. The substrate material may be a plastic, such as PETG, PEEK, etc. In some embodiments, the substrate may be a metal such as aluminum, steel, chromium, titanium, gold, etc.

Substrate 110 may comprise a plurality of pores 113. In some cases, the plurality of pores 113 comprises about 1 hundred thousand to about 100 billion pores. In some cases, the plurality of pores 113 comprises about 1 thousand to about 1 billion pores. In some cases, the plurality of pores 113 comprises about 1 million to about 100 billion pores.

Substrate 110 may comprise a density of pores. The density of pores may comprise the number of pores per square millimeter of an array. The density of pores may be measured at the first surface 111 or the second surface 112. Optionally, in some embodiments, the first array 100 has an open array fraction (packing density) of about 66 percent or from about 40 percent to about 75 percent. In some cases, the pore density may be within a range from 100 to 2500 pores per square millimeter. In some cases, the pore density may be within a range from 500 to 1500 pores per square millimeter. A method of manufacturing a high pore density may be by fusing tubes, such as capillary tubes. The pore density may be varied by varying the wall thickness and central diameter of the tubes.

In one non-limiting example, the first array 110 has a width and length of 10×10 inches, respectively, and comprises 240 million pores 113 with a diameter of 15 um each.

Additionally, the first array 100, per FIG. 1A, has an array height 110*a* measured as a normal distance between the first surface 111 and the second surface 112. In some embodiments, the array height 110*a* can be measured as a maximum or a minimum normal distance between the first surface 111 and the second surface 112. In some embodiments, the array height 110*a* can be measured as a normal height of the pores 113. In some embodiments, the array height 110*a* can be measured as a maximum or a minimum length of the pores 113. Each pore may have a height (or longitudinal length) 113*a*. The length may be uniform between pores, or the length may vary from pore to pore, such as via distortion or irregularity during the manufacturing processes. Optionally, each of the pores 113 has a length of equal to or less than about 50 mm. In some cases, each pore may have a length selected from about 1 mm to about 500 mm. In some cases, each pore may have a length selected from about 1 mm to about 100 mm. In some cases, each pore may have a length selected from about 1 mm to about 10 mm.

Optionally, the plurality of pores 113 may be substantially orthogonal to the first surface 111 and the second surface 112. In some embodiments, the plurality of pores 113 can be substantially parallel to each other. In some embodiments, the first surface opposite the second surfaces may be substantially parallel planes. The plurality of pores may extend orthogonally from the first surface to the second surface. The pores may extend perpendicularly from the first surface to the second surface. Alternatively, the plurality of pores may extend at angle relative to a surface normal from the first surface to the second surface. The angle may be less than 90 degrees from normal. The angle may be less than 60 degrees, less than 45 degrees, less than 30 degrees, or less. The angle may be within a range from 5 to ninety degrees.

In some embodiments, the plurality of pores may traverse an indirect path from the first surface to the second surface. In such embodiments, the pores may be tangled, woven, or interleaved. The pores may comprise one or a plurality of bends, such that a path through the pore substantially changes direction with respect to a direct route from the first surface to the second surface.

Figure 1B:
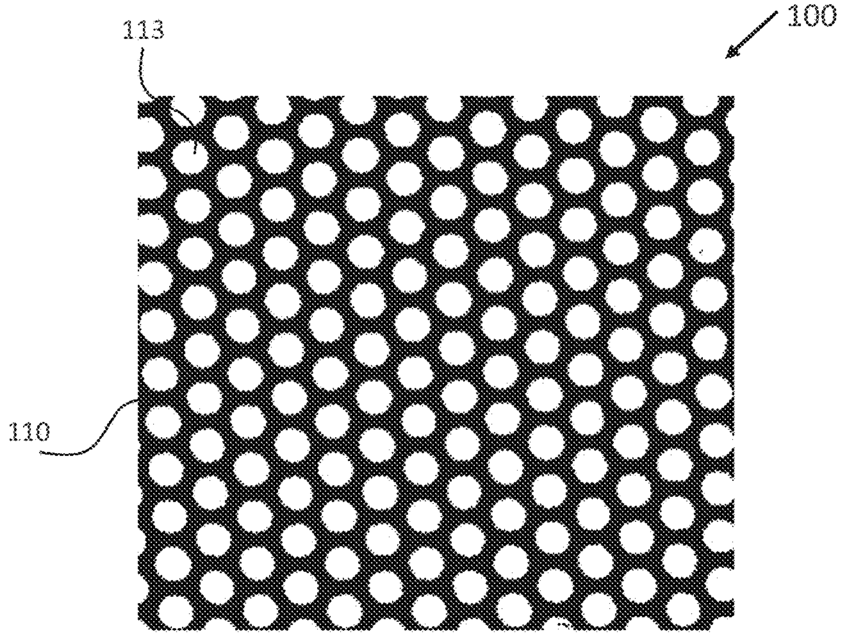
FIG. 1B is a top view of an array for sorting particles, in accordance with some embodiments.

FIG. 1B shows a top view of the array 100 for sorting particles. In some examples, array 100 has a plurality of pores 113. Each of the pores may comprise a cross-section. The cross-section may be circular, may be an oval, may be polyhedral (e.g. square, hexagon, octagon, dodecagon, etc.), or may have an irregular shape. The shape may be uniform between pores, or the pores may vary from pore to pore, such as via distortion or irregularity during the manufacturing processes.

Referring to FIG. 1A, the cross-section of each pore 113 may comprise a cross-sectional dimension 113*b*. The cross-sectional dimension may be measured at either of the two surfaces of the array or at an intermediate position. The cross-sectional dimension may be measured at a single cross-section. Additionally or alternatively, the cross-sectional dimension may be averaged across many positions along the pore. The dimension may be measured in many ways, such as under a microscope using a reference, by interferometer, calculated from flow, etc. In some examples, each pore of the array may comprise a cross-sectional dimension within a range from 5 microns to 100 microns. In some examples, each pore may have a cross-sectional dimension within a range from 15 microns to 50 microns.

In some cases, the cross-sectional dimension may be a diameter. The term diameter is intended to encompass the largest cross-sectional distance across a pore which is round, approximately round, or an oval. In some examples, each pore of the array may comprise a pore diameter within a range from 5 microns to 100 microns. In some examples, each pore may have a diameter within a range from 10 microns to 50 microns.

Each pore 113 may comprise a cross-sectional area. The cross-sectional area may be measured at a single cross-section. Additionally or alternatively, the cross-sectional area may be averaged across many positions along the pore. The white region of pore 113 shown in FIG. 1B may define a cross-sectional area at first surface of a pore. Optionally, each of the micropores 113 has a cross sectional area equal to or less than about one square millimeter. In some cases, each pore of the plurality of pores may have a largest cross-sectional area of about 0.008 $mm^2$ or less.

Each pore 113 of the array may comprise an aspect ratio. The aspect ratio may be the fraction of the length of the pore over the largest cross-sectional dimension of the pore. The aspect ratio may be the fraction of the length of the pore over the diameter of the pore. In some cases, the aspect ratio may be within a range from 10 to 100. In some cases, the aspect ratio may be 10 or greater. In some cases, the aspect ratio may be 20 or greater. In some cases, the aspect ratio may be 100 or greater.

Figure 1C:
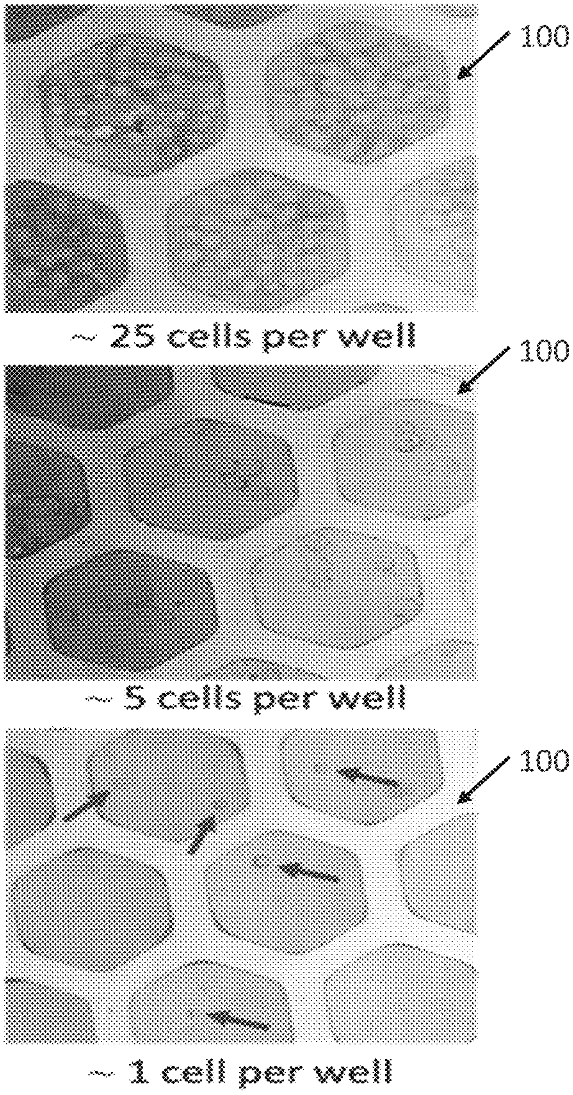
FIG. 1C shows an example image of arrays with different cell concentrations, in accordance with some embodiments.

FIG. 1C shows an example image of arrays with different cell concentrations. Each well may comprise one particle or a plurality of particles of interest, such as a cell, as shown in the illustrated embodiment. The one particle or a plurality of particles may comprise one cell or a plurality of cells. A number of a plurality of cells may be about 1, about 5, about 25, or more. In some examples, a number of a plurality of cells may be less than about 100 or less than about 1000.

In some embodiments, an aqueous sample solution may be deposited onto the array 100, such as by spreading the aqueous sample solution onto the array 100. In some embodiments, the first surface 111 of the array 100 may be hydrophilic, and the aqueous sample solution can be absorbed into the pores 113. In some embodiments, the first surface 111 of the array 100 may distribute a particle of interest, such as a cell within the aqueous sample solution among the micropores 113. In some embodiments, the first surface 111 of the array 100 may randomly distribute the particle of interest within the aqueous sample solution among the micropores 113. In some embodiments, the particle or particles of interest may move through the pore and settle at the bottom of each micropore 113. Optionally, in some embodiments, the particle of interest may be withheld in each pore 113 by the surface tension of the aqueous sample solution.

One or more surface portions of the substrate may be coated with a material. The coated material may be configured to be disrupted in response to electromagnetic radiation being directed at or adjacent to the coated portions of the substrate. Accordingly, once particles of interest are identified as being held within a particular microchannel (pore) of the array, electromagnetic radiation may be directed at the coated portions of the substrate to disrupt the surface material, which can result in breaking of the meniscus of the liquid held in the microchannel to release the particle of interest. In certain embodiments, the electromagnetic radiation can remove, e.g., ablate, a portion of the coated material in or adjacent to a pore in the microarray, thereby breaking the meniscus of the liquid held in the microchannel of the pore.

Surface Material

Figure 2A:
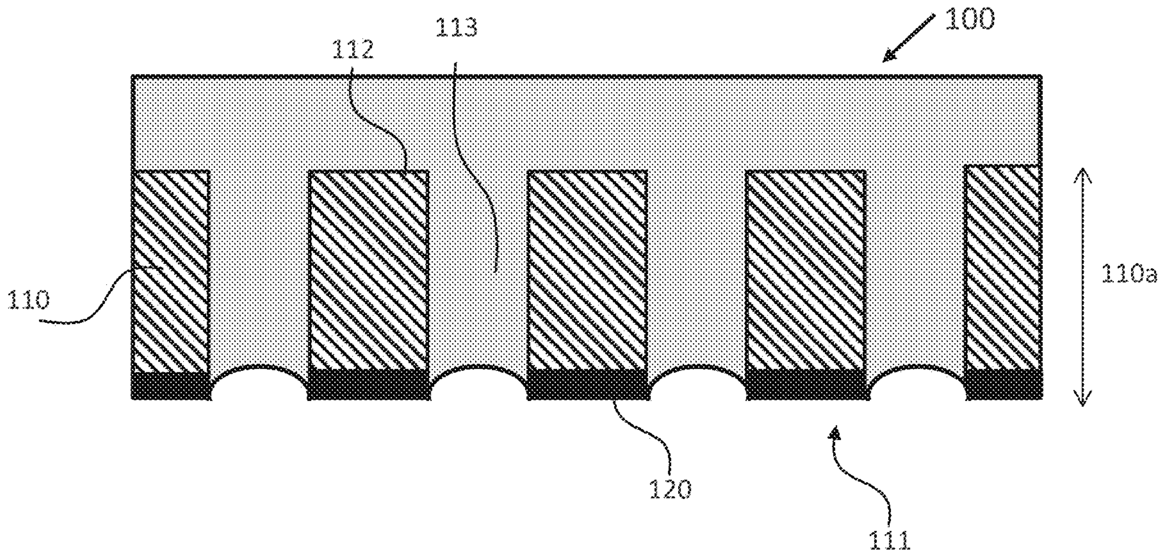
FIG. 2A is a side cross-sectional view of an example array for sorting particles, in accordance with some embodiments.

Provided herein are non-limiting examples of an array 100 comprising a surface material, for example as shown in FIG. 2A through FIG. 17. Referring to FIG. 2A, the surface material 120 may comprise a coating. The coating can be coupled to first surface 111 of the substrate 110. In some embodiments, the surface material 120 may comprise a material different from that of the substrate material. In one example, the coating may comprise a metal such as a transition metal (e.g., gold, and a metal capable of providing adhesion to gold (such as chromium, titanium, nickel, or nickel-chromium). In some embodiments, the surface material may comprise a plurality of layers. The surface material may comprise a combination of metal coatings (e.g. Ti—Au). In some embodiments, the surface material may comprise a metalloid or a metal oxide. In some embodiments, the surface material may comprise Scandium, Titanium, Vanadium, Chromium, Manganese, Iron, Cobalt, Nickel, Copper, Zinc, Yttrium, Zirconium, Platinum, Gold, Mercury, Niobium, Iridium, Molybdenum, Silver, Cadmium, Tantalum, Tungsten, Aluminum, Silicon, Phosphorous, Tin, an oxide of any of the preceding or any combination thereof.

In some embodiments, the surface material 120 may comprise a polymer. In some embodiments, the surface material can include a combination of any of the coating materials described herein. The surface material or coating may be configured to be disrupted from the first surface 111 of the array in response to electromagnetic radiation being directed at or adjacent to a portion of the surface material. Accordingly, once particles of interest are identified as being held within a particular microchannel of the array, electromagnetic radiation may be directed at a surface to disrupt and/or peel the coating, which can break a meniscus of the liquid held in the microchannel to release the particle(s) of interest.

FIG. 2A is a side cross-sectional view of an example array for sorting particles, in accordance with some embodiments. As illustrated in FIG. 2A, the array 100 can comprise a substrate 110. The substrate can comprise a plurality of pores 113. The substrate 110 can comprise a second surface 112 and a first surface 111 opposite the second surface 112. Optionally, the plurality of pores 113 can extend from the first surface 111 to the second surface 112. In some embodiments, the coating 120 can be coupled to the first surface 111.

In some embodiments, array 100 has an open array fraction (packing density) of about 66 percent. In some embodiments, each of the pores 113 has a cross sectional area equal to or less than about one square millimeter. In some embodiments, each of the pores 113 has a diameter of about 50 um to about 150 um. In some embodiments, each of the pores 113 has a length of equal to or less than about 50 mm. In some embodiments, the plurality of pores 113 are orthogonal to the second surface 112 and the first surface 111. In some embodiments, each of the pores 113 in the plurality of pores 113 can be substantially parallel to each other. In some embodiments, the plurality of pores 113 comprises about 1 million to about 100 billion pores.

Additionally, the array 100, per FIG. 2A, has an array height 110*a* measured as a distance from the second surface 112 to the surface material 120. In some embodiments, the array height 110*a* may be measured as a normal distance between the first surface 111 and the second surface 112. In some embodiments, the array height 110*a* can be measured as a maximum or a minimum normal distance between the first surface 111 and the second surface 112. In some embodiments, the array height 110*a* can be measured as a normal height of the pores 113. In some embodiments, the array height 110*a* can be measured as a maximum or a minimum height of the pores 113.

Figure 2B:
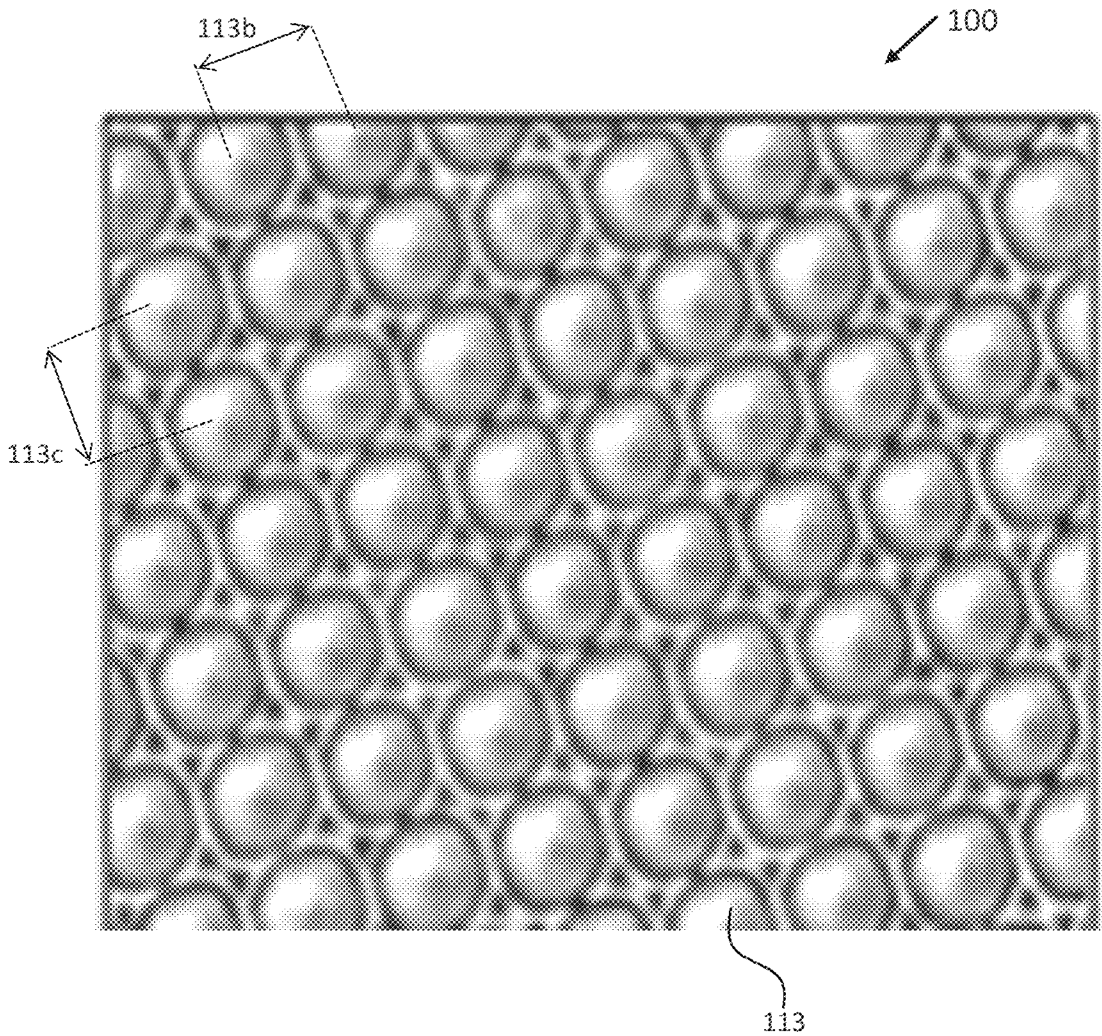
FIG. 2B is an orthogonal view of an example substrate, of the example array, in accordance with some embodiments.

FIG. 2B is a top view of an example array in accordance with some embodiments. The plurality of pores 113, per FIG. 2B, within the array 100 are arranged in an orthogonal pattern. In some embodiments, the pattern comprises a linear pattern, a triangular pattern, a hexagonal pattern, an irregular pattern, or any combination thereof. The orthogonal pattern of pores 113, per FIG. 2B, has at least one of a first separation 113*b* and a second separation 113*c*, wherein the first separation 113*b* and a second separation are measured between the center points of consecutive pores 113. In some embodiments, at least one of the first separation 113*b* and a second separation are measured as a normal distance between opposing points on the surface of consecutive pores 113. In some embodiments, at least one of the first separation 113*b* and the second separation 113*c* can be about 10 mm to about 40 mm.

An array as described herein may comprise a coating 120. The coating can be coupled to one or more surface portions of the substrate. The coating can be configured to be disrupted when subjected to electromagnetic radiation. For example, in response to electromagnetic radiation from a laser being directed at a portion of the coating, the coating can chip or peel off. Optionally, the coating can comprise a material that is different from that of the substrate. For example, the substrate 110 can comprise a first material and the coating 120 can comprise a second material different from the first material.

In some cases, the surface material (coating 120) may coat or partially coat the second surface 112 of the array. In additional or alternative cases, the surface material may coat or partially coat the first surface 111 of the array. In some cases, the surface material may not substantially block access to the lumens of the pores. However, in some instances, blockage of some pores may occur, such as due to variations in coating thickness during manufacturing. The surface material may have an average thickness of about 20 nanometers (nm) to 500 nm. The surface material may have an average thickness of about 100 nm to 500 nm.

In some cases, the surface material (coating 120) may be substantially similar to the substrate material 110. In some instances, the array may be homogeneous. In some embodiments, the homogeneous array does not or need not include a coating. In some embodiments, the homogeneous array comprises a uniform agglomeration or alloy material. In one example, the array comprises a metalloid, a metal (e.g., chromium, titanium, gold, iron, nickel, copper, platinum, or palladium) (e.g., gold and a metal capable of providing adhesion to gold (such as chromium, titanium, nickel, or nickel-chromium)), or any combination thereof. In some embodiments, the substrate material comprises glass, plastic, aluminum, steel, stainless steel, or any combination thereof.

In some cases, the surface material (coating 120) may be substantially different than the substrate material 110. The substrate material may be glass, and the surface material may be a material other than glass. In some cases, the surface material (coating 120) may comprise a metal. In some case, the metal may comprise titanium, gold, chromium, silver, aluminum, or any other metal(s). In some cases, the surface material may comprise a metal oxide, such as magnesium fluoride, calcium fluoride, silicon dioxide, etc. The surface material may comprise layer of metals and/or metal oxides in order to form tailored optical properties such as reflection or absorption.

In some embodiments, the surface material (coating 120) comprises a transition metal (e.g. titanium, gold, etc). In some embodiments, the second material comprises a metalloid. In some embodiments, the second material comprises a metal oxide. In some embodiments, the second material comprises Scandium, Titanium, Vanadium, Chromium, Manganese, Iron, Cobalt, Nickel, Copper, Zinc, Yttrium, Zirconium, Platinum, Gold, Mercury, Niobium, Iridium, Molybdenum, Silver, Cadmium, Tantalum, Tungsten, Aluminum, Silicon, Phosphorous, Tin, an oxide of any of the preceding or any combination thereof.

In some embodiments, the surface material (coating 120) is selected from a material which does not negatively impact cell viability. For example, the surface material may be biocompatible. The surface material may be non-toxic. In certain embodiments, the surface material is selected from a material which when contacted with electromagnetic radiation does not cause cell damage or cell death. For example, products generated from contacting the surface material with electromagnetic radiation may themselves not cause cell damage or cell death. That is, the products generated, for example, by ablation of the surface material may be biocompatible and/or non-toxic to cells. In certain embodiments, impact on cell viability is evaluated by measuring cell viability prior to and after the cells are exposed to the surface material. In certain embodiments, the cell viability remains the same or decreases by less than 40%, less than 30%, less than 20%, less than 15%, less than 10%, or even less than 5%. In certain embodiments, cell viability may be evaluated by measuring cell viability prior to and following contacting the surface material with the electromagnetic radiation. For example, the cell viability is evaluated prior to loading cells into the array and after the cells are released from the pores of the array via contacting the surface material with the electromagnetic radiation. In some examples, the viability remains the same or decreases by less than 40%, less than 30%, less than 20%, less than 15%, less than 10%, less than 5%, or even less than 1%, following contacting the surface material with the electromagnetic radiation.

The array can in some instances have a tailored hydrophobicity. In one example, the second surface 112 can be hydrophilic. Optionally, the second surface 112 need not be hydrophilic itself but can be operably coupled to a hydrophilic coating. In some embodiments, a portion of the coating 120 can be configured to be disrupted from the first surface 111. In some embodiments, a portion of the coating 120 can be configured to be disrupted from the first surface 111 in response to electromagnetic radiation being directed at the portion of the coating. In some embodiments, the coating 120 can be hydrophobic.

The coating 120 can be configured to be disrupted in response to electromagnetic radiation being directed at a portion of the surface material. Accordingly, once particles of interest are identified as being held within a particular microchannel (pore) of the array, electromagnetic radiation can be directed at a coating to disrupt and/or peel the coating 120, which can break a meniscus of the liquid held in the microchannel (pore 113) to release the particle of interest. The coating 120 may absorb at a wavelength or range of wavelengths which correspond to the wavelength emitted by the source of electromagnetic radiation.

Accordingly, once particles of interest are identified as being held within a particular pore of the array, electromagnetic radiation can be directed near or adjacent to the particular pore to release the particle of interest. In some embodiments, the disruption of the surface material comprises removing at least a portion of the material of the array, a coating on the array, or both.

In some embodiments, disruption of the array may be caused by local heating. Such a mechanism may be likely when the pulse duration is longer, the peak power density is lower, and/or the wavelength of the incident radiation is in the infrared. Local heating may cause sublimation of the surface material (coating 120) or of the array material. In some embodiments, the substrate material and the coating 120 comprise different thermal expansion coefficients, which may lead to chipping.

Additionally or alternatively, disruption of the array may be caused by ablation. Such a mechanism may be likely when the incident peak power density is higher, the pulse duration is shorter, the incident power is higher, and/or the incident radiation is in the visible. Ablation may comprise local bond breakage and/or vaporization of the array or substrate material.

Additionally or alternatively, disruption of the array may be caused by plasma generation. This mechanism may be likely when the pulse duration of the incident radiation is especially short, the wavelength of the incident radiation is resonant with a multi-photon ionization mechanism, and or the wavelength of the incident radiation is very short. Pulse durations on the order of picoseconds to femtoseconds may yield faster plasma generation than local heating leading to optical etching of the substrate or surface mater.

Additionally or alternatively, disruption of the array may occur by shock wave generation. Such a mechanism may be more likely when the peak power density is higher, a phonon is resonant, and/or the pulse duration is shorter. Shock may cause physical vibration, chipping, or shaking of the surface or array material.

In an example, the surface material (coating 120) absorbs a range of wavelengths in visible or infrared. In some embodiments, the surface material may be opaque. The surface material may absorb at least a 5 nanometer band selected within a visible and infrared range. The surface material may absorb greater than 10 percent of incident radiation within an at least 5 nanometer band selected from 0.4 to 2.5 microns. The surface material may absorb greater than 10 percent of incident electromagnetic radiation of a wavelength selected from 0.4 microns to 2.5 microns. In some cases, the surface material may absorb greater than 50 percent of incident radiation within an at least 5 nanometer band. The 5 nanometer band may be selected within a range of wavelengths from 0.4 to 2.5 microns. The surface material may absorb greater than 50 percent of incident electromagnetic radiation of a wavelength selected from 0.4 microns to 1.5 microns. The surface material may absorb greater than 10 percent of incident radiation at wavelength selected from the harmonics of a doped Ytterbium Orthovanadate or Ytterbium Aluminum Garnet solid state laser. The surface material may absorb greater than 10 percent of incident 1064 nanometer radiation.

In one example, the coating 120 of an array 100 has an average thickness of about 600 nm. A thickness of the coating 120 can be reduced in thickness by an infrared (IR) laser by about 100 nm or less, such as about 75 nm or less, or even about 50 nm or less. The coating thickness may be between 10 and 1000 nm. In some embodiments the coating, or any discernible layer thereof, has a thickness of, or of about, 10 nm, 20 nm, 30 nm, 40 nm, 50 nm, 60 nm, 70 nm, 80 nm, 90 nm, 100 nm, 150 nm, 200 nm, 250 nm, 300 nm, 300 nm, 400 nm, 450 nm, 500 nm, 550 nm, 600 nm, 650 nm, 700 nm, 750 nm, 800 nm, 850 nm, 900 nm, 950 nm, or 1000 nm, or any range between two of the foregoing values. In some embodiments the coating, or any discernible layer thereof, has a thickness of at least, or of at least about, 10 nm, 20 nm, 30 nm, 40 nm, 50 nm, 60 nm, 70 nm, 80 nm, 90 nm, 100 nm, 150 nm, 200 nm, 250 nm, 300 nm, 300 nm, 400 nm, 450 nm, 500 nm, 550 nm, 600 nm, 650 nm, 700 nm, 750 nm, 800 nm, 850 nm, 900 nm, 950 nm, or 1000 nm. In some embodiments the coating, or any discernible layer thereof, has a thickness of at least, or of at least about, 10 nm, 20 nm, 30 nm, 40 nm, 50 nm, 60 nm, 70 nm, 80 nm, 90 nm, 100 nm, 150 nm, 200 nm, 250 nm, 300 nm, 300 nm, 400 nm, 450 nm, 500 nm, 550 nm, 600 nm, 650 nm, 700 nm, 750 nm, 800 nm, 850 nm, 900 nm, 950 nm, or 1000 nm. In some embodiments the coating thickness may be at least 10 nm, 20 nm, 30 nm, 40 nm, 50 nm, 100 nm, 200 nm, 300 nm, 400 nm, 500 nm, 600 nm, 800 nm, 1000 nm, or more. In some embodiments the coating thickness may be at most 1000 nm, 800 nm, 600 nm, 500 nm, 400 nm, 300 nm, 200 nm, 100 nm, 50 nm, 40 nm, 30 nm, 20 nm, 10 nm, or less. The layer structure(s) of the coating may be determined using energy dispersive X-ray spectroscopy (EDS or EDX).

In some embodiments, the source of electromagnetic radiation may be configured to reduce the average thickness of the coating 120 by about 1 nm to about 5 nm, by about 1 nm to about 10 nm, by about 1 nm to about 20 nm, by about 1 nm to about 30 nm, by about 1 nm to about 40 nm, by about 1 nm to about 60 nm, by about 1 nm to about 70 nm, by about 1 nm to about 80 nm, by about 1 nm to about 90 nm, or by about 1 nm to about 100 nm.

In some embodiments, the source of electromagnetic radiation may be configured to ablate a portion of the array at an average depth of about 1 nm to about 5 nm, of about 1 nm to about 10 nm, of about 1 nm to about 20 nm, of about 1 nm to about 30 nm, of about 1 nm to about 40 nm, of about 1 nm to about 60 nm, of about 1 nm to about 70 nm, of about 1 nm to about 80 nm, of about 1 nm to about 90 nm, or by about 1 nm to about 100 nm.

In some embodiments, the source of electromagnetic radiation may be configured to remove a portion of the coating 120 or of the array, the portion having a surface area of about 1 $\mu m^2$ to about 30 $\mu m^2$, 1 $\mu m^2$ to about 20 $\mu m^2$, about 1 $\mu m^2$ to about 10 $\mu m^2$, or about 1 $\mu m^2$ to about 5 $\mu m^2$.

In some embodiments, the source of electromagnetic radiation may be configured to ablate a portion of the array at an average distance from a circumference of the micropore of about 1 nm to about 5 nm, of about 1 nm to about 10 nm, of about 1 nm to about 20 nm, of about 1 nm to about 30 nm, of about 1 nm to about 40 nm, of about 1 nm to about 60 nm, of about 1 nm to about 70 nm, of about 1 nm to about 80 nm, of about 1 nm to about 90 nm, or by about 1 nm to about 100 nm.

Figure 3A:
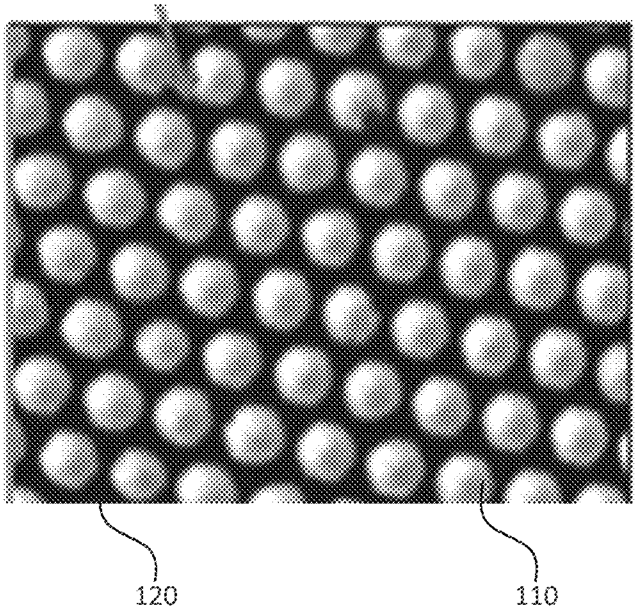
FIG. 3A is an orthogonal view of an example array for sorting particles, in accordance with some embodiments.
Figure 3B:
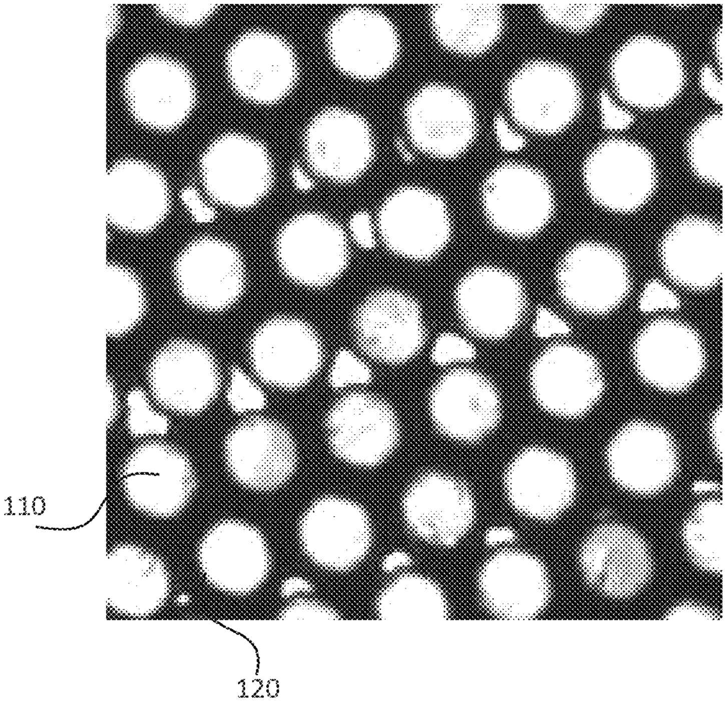
FIG. 3B is an orthogonal view of an example array for sorting particles comprising a coating removed at locations adjacent to pores by a laser, in accordance with some embodiments.

FIG. 3A shows a top view of an example array for sorting particles comprising a coating, in accordance with some embodiments. FIG. 3B shows a top view of a non-limiting example array for sorting particles comprising a coating removed by a laser, in accordance with some embodiments. Referring to FIGS. 3A and 3B, the coating 120 can absorb the electromagnetic energy, which causes it to disrupt from the substrate 110, which disturbs the meniscus of the fluid within each pore 113 to eject the cells within. FIG. 3B shows pieces of the coating 120 removed from the substrate 110 by the electromagnetic energy. Referring to FIG. 3B, the laser can be focused at or adjacent a single pore, between two adjacent pores, or equidistant from three pores. In some embodiments, focusing the infrared laser near a single pore, between two adjacent pores, or equidistant from three pores disturbs the meniscus of the fluid within one, two, or three pores 113, respectively, to eject the cells within. In some embodiments, focusing the laser closer to a specific pore decreases the likelihood of inadvertently ejecting cells within neighboring pores. In some embodiments, at least one of the intensity and duration of the infrared laser can be configured for controlled ejection of cells within one, two, or three pores.

In some embodiments, the surface material (coating 120) can be formed by sputtering a material on the array 100. In some embodiments, the surface material may comprise one or more metals (e.g. titanium, gold). The thickness of the surface material may be between 10 and 1000 nm. In some embodiments the thickness of the surface material may be at least 10 nm, 20 nm, 30 nm, 40 nm, 50 nm, 100 nm, 200 nm, 300 nm, 400 nm, 500 nm, 600 nm, 800 nm, 1000 nm, or more. In some embodiments the thickness of the surface material may be at most 1000 nm, 800 nm, 600 nm, 500 nm, 400 nm, 300 nm, 200 nm, 100 nm, 50 nm, 40 nm, 30 nm, 20 nm, 10 nm, or less. In some embodiments, the surface material may comprise a Ti—Au stack. A thickness of the titanium layer may be at least 10 nm, 20 nm, 30 nm, 40 nm, 50 nm, 100 nm, 200 nm, or more. The gold layer may be formed directly on the titanium layer. A thickness of the gold layer may be at least 100 nm, 200 nm, 300 nm, 400 nm, 500 nm, 600 nm, 700 nm, or more. In some embodiments, the surface material may comprise a titanium layer, and the gold layer may be optional.

In some embodiments, the sputtering can be performed under a vacuum. In some embodiments, the vacuum can be about 0.08 to about 0.02 mbar. In some embodiments, the sputtering can be performed under a voltage of about 100V to 3 kV. In some embodiments, the voltage may be at least about 100 V, 110 V, 130 V, 150 V, 170 V, 220 V, 280 V, 500 V, 1000 V, 2000 V, 3000 V, or more. In some embodiments, the voltage may be at most about 3000 V, 2000 V, 1000 V, 500 V, 280 V, 220 V, 170 V, 150 V, 130 V, 110 V, 100 V, or less. In some embodiments, the sputtering can be performed under an electric current: 0 to 50 mA. In some embodiments, the electric current may be at least about 0.01 mA, 0.1 mA, 1 mA, 5 mA, 10 mA, 20 mA, 30 mA, 40 mA, 50 mA, or more. In some embodiments, the electric current may be at most about 50 mA, 40 mA, 30 mA, 20 mA, 10 mA, 1 mA, 0.1 mA, 0.01 mA, or less. Optionally, in some embodiments, the surface material (coating 120) can be sputtered at only one side (111 or 112) or on both sides (111 and 112) of the array. For example, in some embodiments, the surface material may be sputtered on a first side (e.g. 111) of the array. In other embodiments, the surface material may be sputtered on a second side (e.g. 112) of glass array. In some further embodiments, the surface material may be sputtered on a first side (e.g. 111) and a second side (e.g. 112) of the array.

In some embodiments, extraction of PBMC comprises adding a surfactant and a receiving media onto the coated array; inserting the array can be assembled into a cassette with coated side facing down, towards the receiving media; dropping PBMC on the array, and allowing the PBMC to settle into the pores. In some embodiments, the surfactant protects the integrity of the cell membrane and improves robustness under liquid shear. In some embodiments, the surfactant comprises a non-ionic surfactant. In some embodiments, the non-ionic surfactant comprises 0.1 percent of pluoronic F68. In some embodiments, the receiving media comprises OptiPEAK T Cell media. In some embodiments, the receiving media further comprises streptavidin. In some embodiments, the PBMC are allowed to settle into the micropores for a period of time of about 5 minutes.

In some embodiments, infrared (IR) energy emitted from a laser and absorbed by the surface material coating 120 (e.g. a Ti—Au stack, a Ti layer, or a Au layer) may cause the coating to expand and delaminate at the bottom edges of each micropore to extract the PBMC from each of the micropores. The separation of the coating at the bottom edge of each micropore breaks the meniscus of the fluid therein to release the PBMC.

Figure 4A:
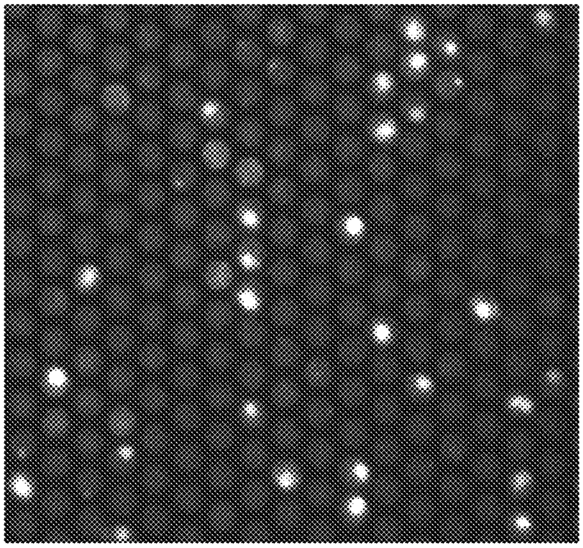
FIG. 4A is an orthogonal view of IR energy absorbing fluorescent dye stained PBMCs in an example first array, in accordance with some embodiments.
Figure 4B:
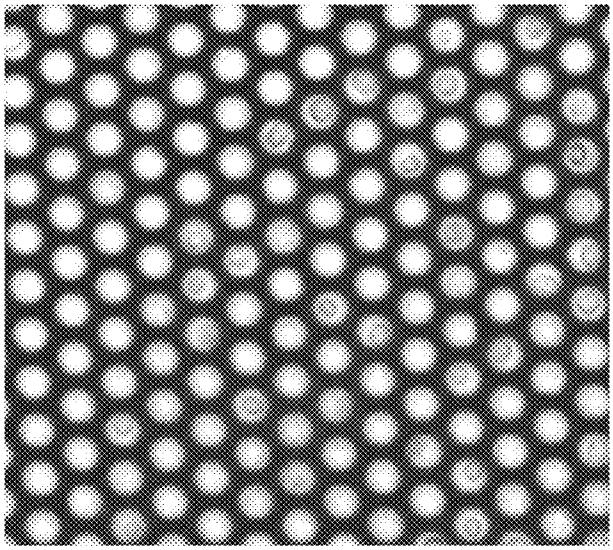
FIG. 4B is an orthogonal view of an example first array after extraction of the PBMCs, in accordance with some embodiments

FIG. 4A is a top view of IR energy absorbing fluorescent dye stained PBMCs in a non-limiting example of an array comprising a surface material coating (e.g. a Ti—Au stack, a Ti layer, or a Au layer) in accordance with some embodiments. FIG. 4B is a top view of an example of the array comprising a surface material coating after extraction of the PBMCs, in accordance with some embodiments.

Beads

In certain embodiments, the pores of the arrays may comprise beads which absorb electromagnetic radiation and affect the breaking of a fluid meniscus in the pores. In some cases, the beard may be bound to the luminal surface of the pore or may be unbound (added to the pore in a liquid mixture). Provided herein is a bead comprising a core and a shell. The beads of the present disclosure may be referend to as "microspheres". The core may comprise an infrared (IR) absorbing core. The shell may comprise a non-IR absorbing shell. A bead of the disclosure may be associated with a pore of an array and the bead may absorb electromagnetic radiation. The non-IR absorbing shell may insulate the IR absorbing core from nearby particles, e.g., cells, thereby protecting the particles from damaging effects of the core with IR absorbed radiation. The bead may further comprise agarose. The non-IR absorbing shell may comprise agarose. The bead may further comprise dextran. The bead may be stained with an IR absorbing dye. The bead may comprise a diameter equal to or less than about 20 μm, such as from about 1 μm to about 20 μm, or about 5 μm to about 20 μm. The bead may comprise an absorbing shell which may be equal to or less than about 10 microns. In some embodiments, the surface material of an array as described herein may comprise a bead comprising an infrared absorbing core, and a non-infrared absorbing shell, wherein an external diameter of the non-infrared absorbing shell is equal to or less than about 10 microns.

Figure 5A:
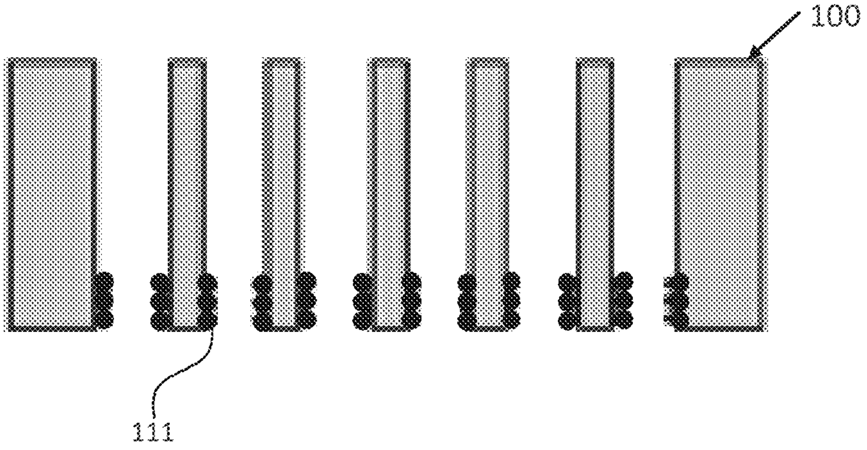
FIG. 5A shows a side cross-sectional view of an array comprising microspheres, in accordance with some embodiments.
Figure 5B:
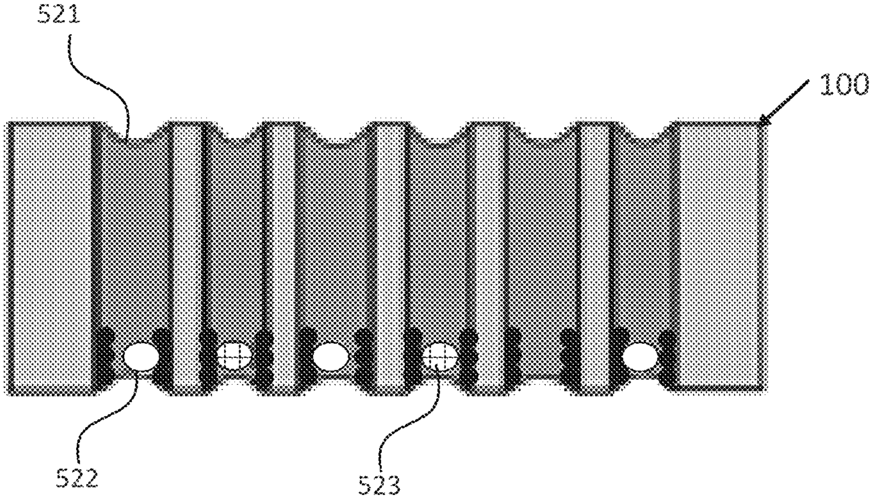
FIG. 5B shows a side cross-sectional view of an array comprising microspheres and an aqueous sample solution, in accordance with some embodiments.

FIG. 5A shows array 100 comprising beads disposed therein. In some cases, the beads may be disposed on the interior of a lumen of a pore. In some cases, the beads may be disposed on a first surface 111. In some cases, the beads may be disposed within the lumen of the pore. FIG. 5B shows a side cross-sectioned view of an aqueous sample solution within the example array of FIG. 5A. In some embodiments, depositing the aqueous sample solution 521 onto the array 100 comprises spreading the aqueous sample solution 521 onto the array 100. In some embodiments, the hydrophilic first surface 111 of the array 100 absorbs the aqueous sample solution 521 into the pores 113. In some embodiments, the hydrophilic first surface 111 of the array 100 evenly distributes the first cells 522 and the second cells 523 within the aqueous sample solution 521 among the pores 113. In some embodiments, the hydrophilic first surface 111 of the array 100 randomly distributes the first cells 522 and the second cells 523 within the aqueous sample solution 521 among the pores 113. In some embodiments, the first cells 522 and the second cells 523 settle at the bottom of each pore 113. Optionally, in some embodiments, the first cells 522 and the second cells 523 are withheld in each pore 113 by the surface tension of the aqueous sample solution 521.

Figure 6A:
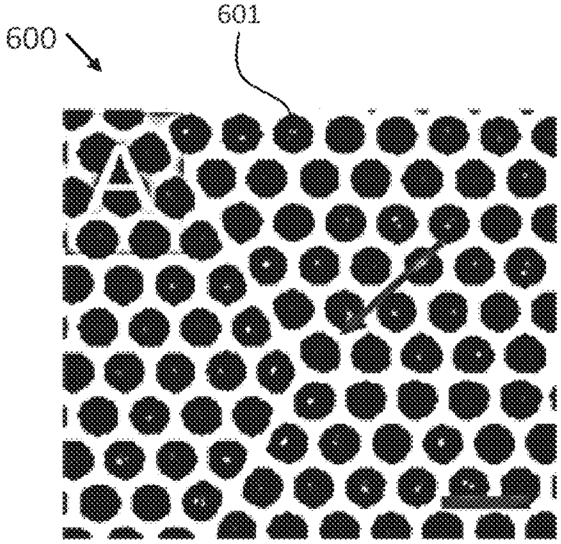
FIG. 6A shows a bright field image of the array of micropores filled with microspheres and cells, in accordance with some embodiments.
Figure 6B:
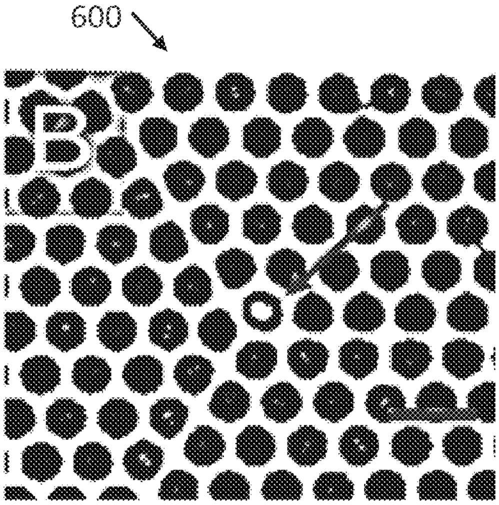
FIG. 6B shows a bright field image of the extraction of a cell from a single pore, in accordance with some embodiments.
Figure 6C:
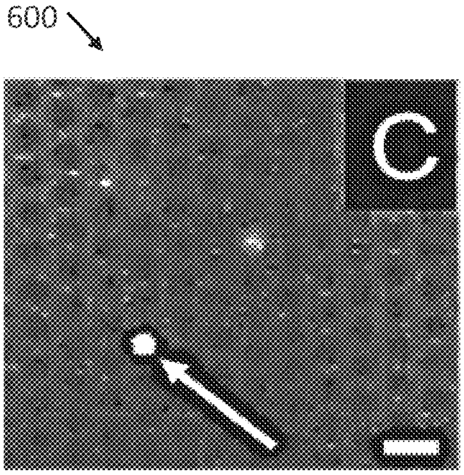
FIG. 6C shows an image of the array of pores filled with microspheres and one cell, in accordance with some embodiments.
Figure 6D:
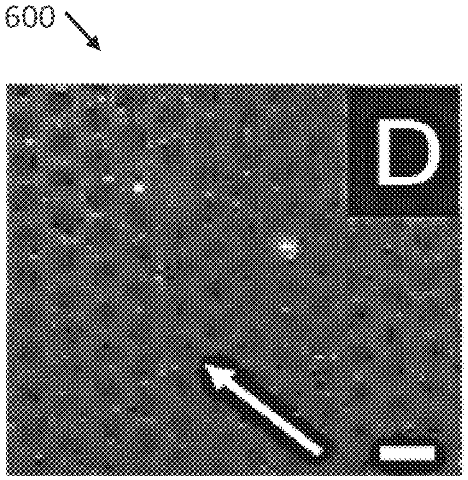
FIG. 6D shows an image of the array after the extraction of a cell from a single micropore, in accordance with some embodiments.

FIG. 6A shows a bright field image of the array of micropores filled with microspheres and cells, in accordance with some embodiments. As seen in FIG. 6A, each of the micropores 601 within the array 600 can be occluded by the microbeads and the cells in each respective the micropores 601. FIG. 6B shows a bright field image of the extraction of a cell from a single micropore, in accordance with some embodiments. As seen in FIG. 6B, only one micropore 601 within the array 600 is not occluded by the cells, indicating that only the cells in the single micropore 601 have been removed. FIG. 6C shows an image of the array of micropores filled with microspheres and cells, in accordance with some embodiments. As seen in FIG. 6C, only one of the micropores 601 within the array 600 comprises a cell. FIG. 6D shows an image of the array 600 after the extraction of the cell from a single micropore, in accordance with some embodiments. As seen in FIG. 6D, none of the micropore 601 within the array 600 comprise a cell, indicating that the single cell in the single micropore 601 has been removed.

Figure 7A:
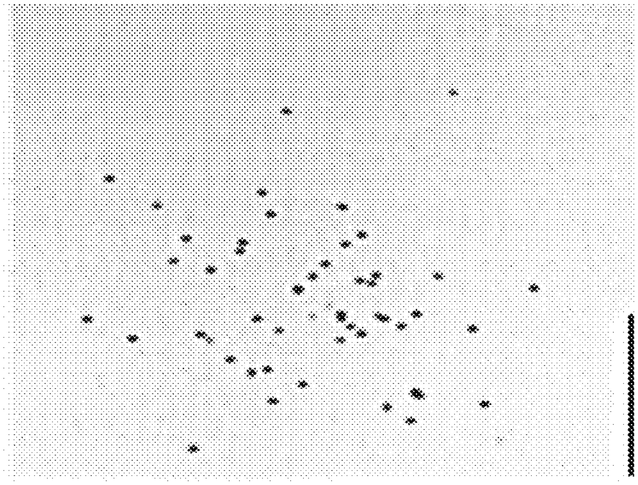
FIG. 7A shows an example bright field image of an extracted cell, in accordance with some embodiments.
Figure 7B:
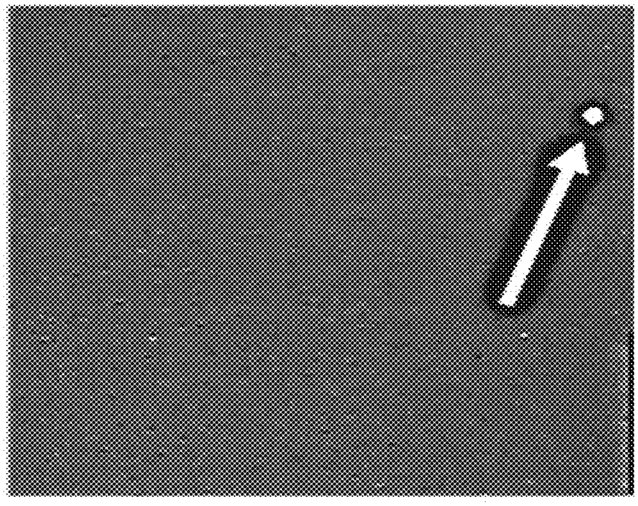
FIG. 7B shows an example image of an extracted cell, in accordance with some embodiments.

FIG. 7A shows an example bright field image of an extracted cell, in accordance with some embodiments. FIG. 7B shows an example image of an extracted cell, in accordance with some embodiments.

Figure 8:
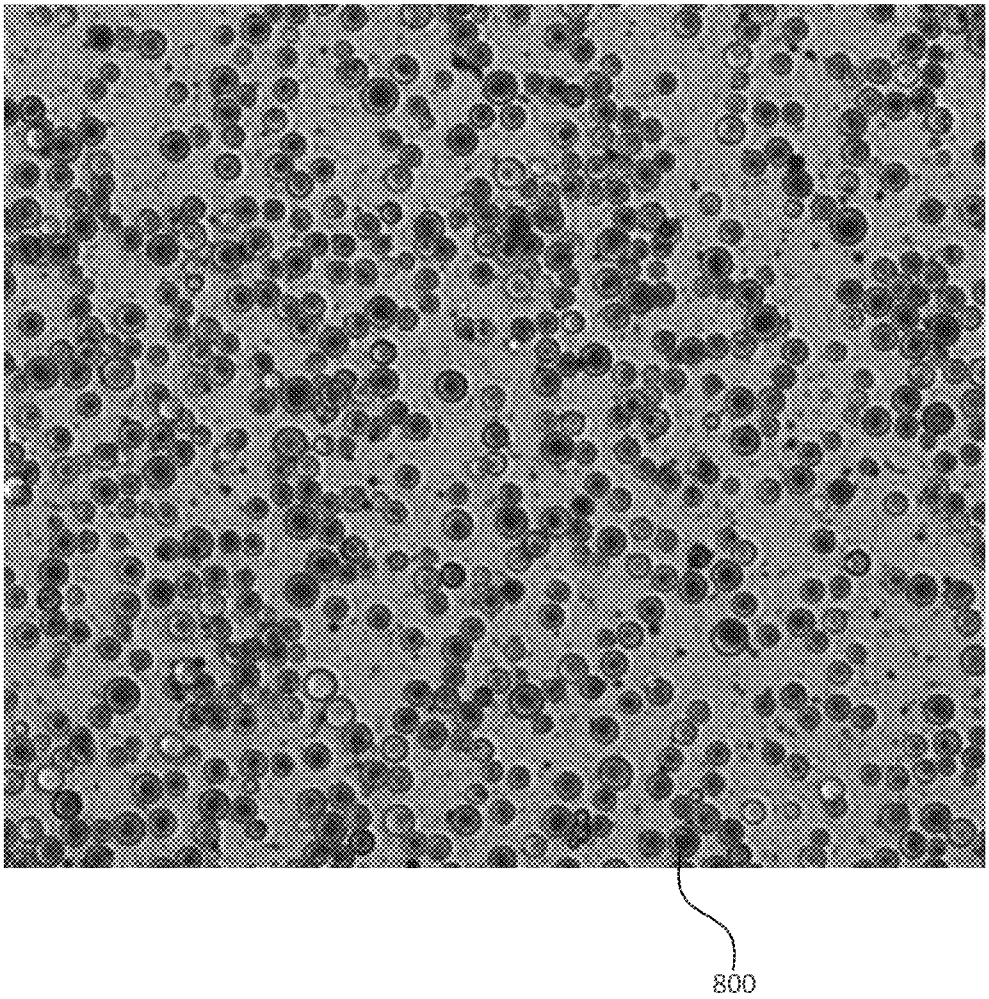
FIG. 8 shows a bright field image of an example microsphere comprising agarose and dextran, in accordance with some embodiments.

Provided herein, per FIGS. 8, 9, 10A, and 10B, are example beads or microspheres. FIG. 8 shows a bright field image of an example agarose and dextran microsphere. In some embodiments, the agarose and dextran microspheres 800 are configured to absorb infrared light. In some embodiments, the agarose and dextran microspheres 800 have are opaque, black, or both. In some embodiments, the agarose and dextran microspheres 800 comprise polymer shell iron oxide microspheres 800. In some embodiments, the agarose and dextran microsphere 800 has a diameter of about 6 um to about 20 um.

Figure 9:
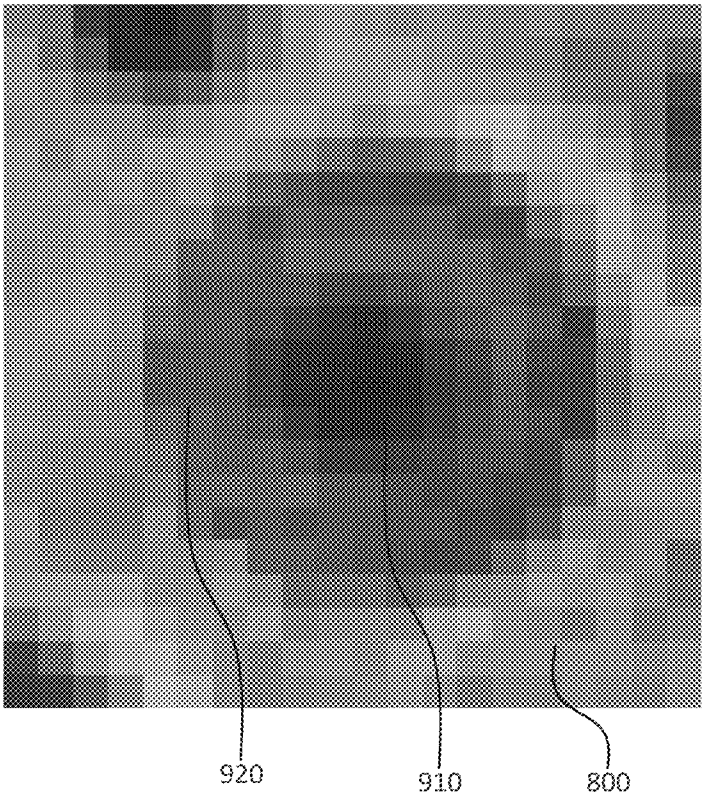
FIG. 9 shows a high magnification infrared image of the example microsphere comprising agarose and dextran, in accordance with some embodiments.

FIG. 9 shows a high magnification infrared image of the example agarose and dextran microsphere. As seen in FIG. 9, the agarose and dextran microsphere 800 comprises an infrared (IR) absorbing core 910 and a non-IR absorbing shell 920. In some embodiments, the IR absorbing core 910 comprises an IR absorbing dye. In some embodiments, the IR absorbing dye comprises Epolight 1178. In some embodiments, the non-IR absorbing shell 920 comprises agarose and dextran.

Employing an IR core dyed particle may be advantageous for efficient cell extraction. First, a dye integrated into the molecular structure of the agarose core may increase IR absorption more than a dye coating. Further, the non-IR absorbing soft shell may act as a buffering layer to protect cells from the stress and thermal shock associated with any potential absorbed heat, volume expansion, and/or microbubble formation. Both may allow for increased extraction efficiency (higher number of successful extraction events), and high cell viability.

Figure 10A:
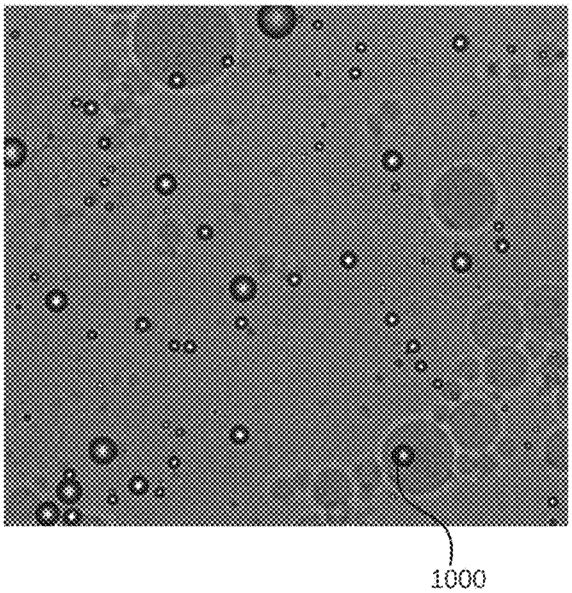
FIG. 10A shows a bright field image of an example microsphere comprising agarose and an IR absorbing dye, in accordance with some embodiments.
Figure 10B:
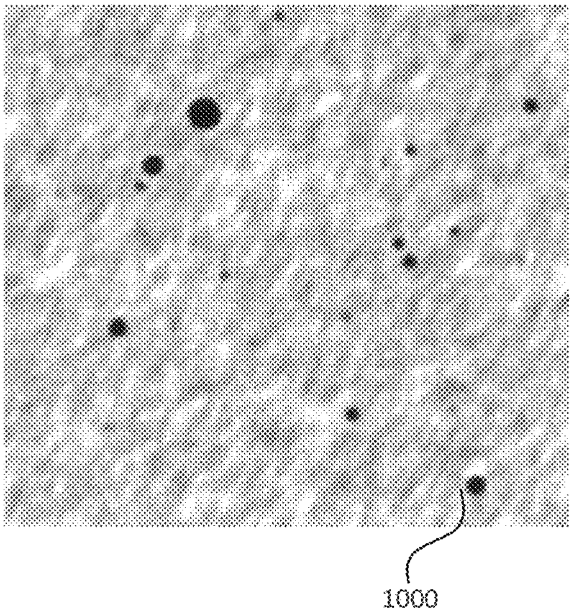
FIG. 10B shows an infrared image of an example microsphere comprising agarose and an IR absorbing dye, in accordance with some embodiments.

FIG. 10A shows a bright field image of an example agarose and IR dye microsphere. FIG. 10B shows an infrared image of an example agarose and IR dye microsphere. As seen in FIG. 10B, the agarose and IR dye microsphere 1000 can be infrared (IR) absorbing. In some embodiments, the agarose and IR dye microsphere 1000 comprises agarose. In some embodiments, the agarose and IR dye microsphere 1000 comprises an IR absorbing dye. In some embodiments, the IR absorbing dye comprises Epolight. In some embodiments, the dye comprises green fluorescent protein. In some embodiments, the dye comprises red fluorescent protein. In some embodiments, the dye comprises a cyanine dye, an acridine dye, a flourone dye, an oxazine dye, a rhodomine dye, a coumarin dye, a pheanthridine dye, a BODIPY dye, an ALEXA dye, a perylene dye, an anthracene dye, a naphthaline dye, etc. In some embodiments, the agarose and IR dye microsphere 1000 has a diameter of about 2 μm to about 16 μm.

Figure 11A:
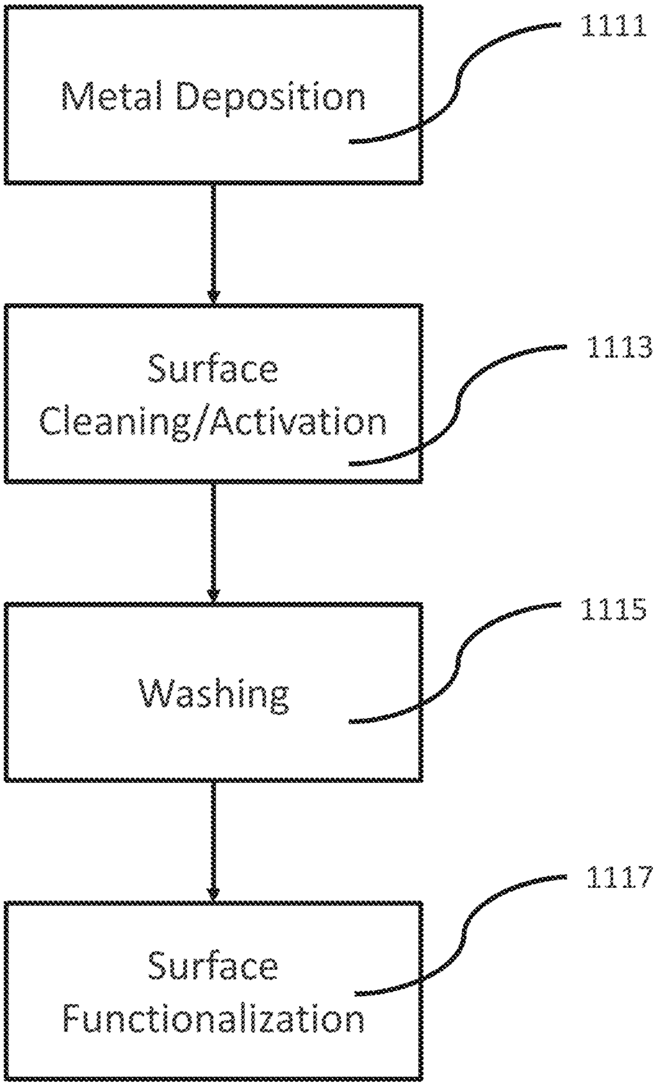
FIG. 11A illustrates a flowchart of a coating procedure, in accordance with some embodiments.
Figure 11B:
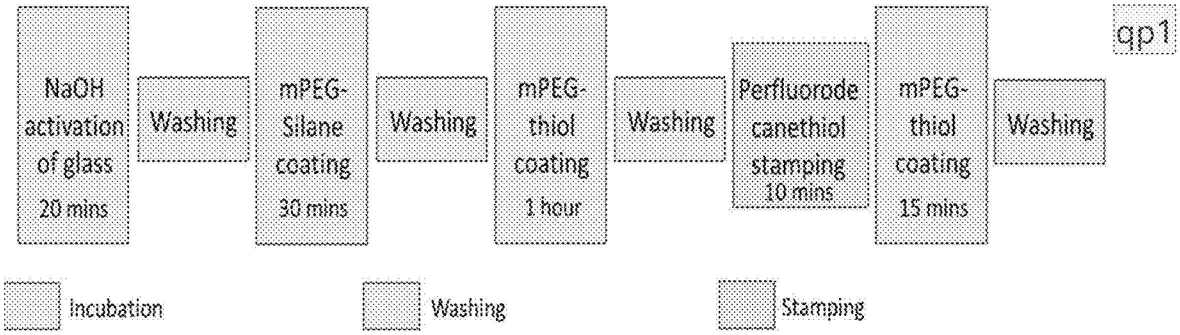
FIG. 11B illustrates additional details of the coating procedure of FIG. 11A, in accordance with some embodiments.
Figures 13A, 13B, 13C, 13D:
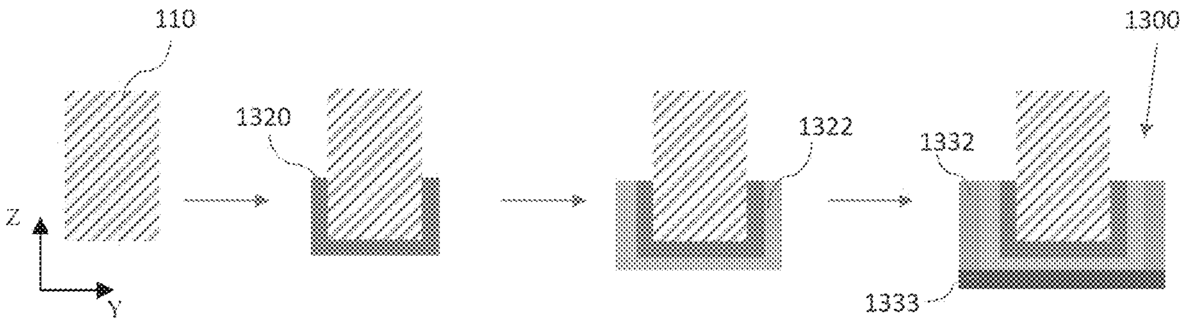
FIG. 13A shows a cross-sectional view of the bottom end of an array prior to surface modification, in accordance with some embodiments.
FIG. 13B shows a cross-sectional view of the bottom end of an array coated with one layer of a pretreatment material, in accordance with some embodiments.
FIG. 13C shows a cross-sectional view of the bottom end of an array coated with a first material and a second material, in accordance with some embodiments.
FIG. 13D shows a cross-sectional view of the bottom end of an array with two layers of coating materials and surface modification, in accordance with some embodiments.

FIGS. 11A and 11B shows example procedures for modification of all or part of one or more surfaces of the substrate 110. In some embodiments, the bottom surface and a part of the vertical sidewall of the pore plate may first be coated with a surface coating (step 1111), for example as shown in FIG. 13B and/or FIG. 13C. The surface coating may comprise one or more heat-conductive or electrically conductive materials. Step 1111 may comprise metal deposition. The surface coating may comprise one or more metals selected from the group consisting of chromium, titanium, gold, iron, nickel, copper, platinum, and palladium. The surface coating may comprise one or more metal layers (e.g., 1320 and 1322 shown in FIG. 13C), each layer independently selected from the group consisting of chromium, titanium, gold, iron, nickel, copper, platinum, palladium, any mixtures thereof, and any alloys thereof. The surface coating may comprise a metal layer and an adhesion layer for the metal layer underneath. The adhesion layer may be used to promote adhesion to the substrate material. The surface coating may comprise a layer of gold and a gold-adhesion layer (such as chromium, titanium, nickel, or nickel-chromium) underneath the gold. The surface coating (step 1111) may be carried out using any suitable coating method, such as sputtering, spin coating, chemical vapor deposition (CVD), physical vapor deposition (PVD), pulsed laser deposition, atomic layer deposition, low pressure CVD, or any combination thereof. In some embodiments, the surface coating may be the same as coating 120. In some embodiments, the coating process (step 1111) may include metal deposition. In some cases, the metal coating may comprise one or more metals (e.g. Cr, Ni, Ti, Au). In some embodiments, the metal coating may include a Ti—Au stack. In some embodiments, the metal coating may include a Cr—Au stack. In some embodiments, the metal coating may include a Ni—Au stack.

Next, the surface of the pore plate may then be cleaned and/or activated by physical or chemical means (step 1113), such as by plasma cleaning, by immersing the plate in a basic solution, or a combination thereof. The physical or chemical means (step 1113) may enhance the adhesion of the subsequent layers onto the coating obtained from step 1111. In some embodiments, the basic solution may comprise NaOH with a predefined concentration. In some embodiments, the predefined concentration may be about 1 M to 3 M. In some embodiments, the predefined concentration may be, or may be about, 3 M, 2.5 M, 2 M, 1.5 M, 1 M, or any range between any two of the foregoing values (inclusive). In some embodiments, the predefined concentration may be least 1 M, 1.5 M, 2 M, 2.5 M, 3 M, or more. In some embodiments, the predefined concentration may be most 3 M, 2.5 M, 2 M, 1.5 M, 1 M, or less. In some embodiments, the pore plate may be soaked in the basic solution for a predefined period of time. In some embodiments, the predefined period of time may be between about 15 minutes to 12 hours. In some embodiments, the predefined period of time may be at most 12 hours, 10 hours, 8 hours, 7 hours, 6 hours, 5 hours, 4 hours, 3 hours, 2 hours, 1 hour, 50 minutes, 40 minutes, 35 minutes, 30 minutes, 25 minutes, 20 minutes, 15 minutes, or less. In some embodiments, the predefined period of time may be at least 15 minutes, 20 minutes, 25 minutes, 30 minutes, 35 minutes, 40 minutes, 50 minutes, 1 hour, 2 hours, 3 hours, 4 hours, 5 hours, 6 hours, 8 hours, 10 hours, 12 hours, or more.

Next, the pore plate may then be cleaned to remove impurities e.g. residual basic solution (step 1115), by for example washing with deionized water. The pore plate may be dried using pressurized air, e.g. from a pressurized air gun.

In some embodiments, the pore plate may be plasma cleaned with any suitable plasma in a chamber for a predefined period of time. The suitable plasma may be an argon plasma, a compressed air plasma, a flame-based plasma, or a vacuum plasma. The predefined period of time may be, or may be about, 10 sec, 20 sec, 30 sec, 40 sec, 50 sec, 1 min, 70 sec, 80 sec, 90 sec, 100 sec, 110 sec, 2 min, 130 sec, 140 sec, 150 sec, 160 sec, 170 sec, 3 min, 3.5 min, 4 min, 4.5 min, 5 min, 5.5 min, 6 min, 6.5 min, 7 min, 7.5 min, 8 min, 8.5 min, 9 min, 9.5 min, 10 min, 11 min, 12 min, 13 min, 14 min, or 15 min, or any range between any two of the foregoing values (inclusive). The predefined period of time may be at least, or at least about, 10 sec, 20 sec, 30 sec, 40 sec, 50 sec, 1 min, 70 sec, 80 sec, 90 sec, 100 sec, 110 sec, 2 min, 130 sec, 140 sec, 150 sec, 160 sec, 170 sec, 3 min, 3.5 min, 4 min, 4.5 min, 5 min, 5.5 min, 6 min, 6.5 min, 7 min, 7.5 min, 8 min, 8.5 min, 9 min, 9.5 min, 10 min, 11 min, 12 min, 13 min, 14 min, or 15 min. The predefined period of time may be at most, or at most about, 10 sec, 20 sec, 30 sec, 40 sec, 50 sec, 1 min, 70 sec, 80 sec, 90 sec, 100 sec, 110 sec, 2 min, 130 sec, 140 sec, 150 sec, 160 sec, 170 sec, 3 min, 3.5 min, 4 min, 4.5 min, 5 min, 5.5 min, 6 min, 6.5 min, 7 min, 7.5 min, 8 min, 8.5 min, 9 min, 9.5 min, 10 min, 11 min, 12 min, 13 min, 14 min, or 15 min. The chamber used in the plasma cleaning may be an ultra-high vacuum (UHV) chamber.

In some embodiments, the pore plate subsequent to step 1113 may be washed in one or more passes using one or more washing liquid (step 1115). In each pass, a washing liquid may be independently selected from the group consisting of water, alcohol (such as methanol, ethanol, isopropanol, butanol), acetonitrile, acetone, toluene, and mixtures thereof. Each pass may independently last a predefined period of time. The predefined period of time may be, or may be about, 10 sec, 20 sec, 30 sec, 40 sec, 50 sec, 1 min, 70 sec, 80 sec, 90 sec, 100 sec, 110 sec, 2 min, 130 sec, 140 sec, 150 sec, 160 sec, 170 sec, 3 min, 3.5 min, 4 min, 4.5 min, 5 min, 5.5 min, 6 min, 6.5 min, 7 min, 7.5 min, 8 min, 8.5 min, 9 min, 9.5 min, 10 min, 11 min, 12 min, 13 min, 14 min, 15 min, 20 min, 25 min, 30 min, 35 min, 40 min, 45 min, 50 min, 55 min, or 1 hr, or any range between any two of the foregoing values (inclusive). The predefined period of time may be at least, or at least about, 10 sec, 20 sec, 30 sec, 40 sec, 50 sec, 1 min, 70 sec, 80 sec, 90 sec, 100 sec, 110 sec, 2 min, 130 sec, 140 sec, 150 sec, 160 sec, 170 sec, 3 min, 3.5 min, 4 min, 4.5 min, 5 min, 5.5 min, 6 min, 6.5 min, 7 min, 7.5 min, 8 min, 8.5 min, 9 min, 9.5 min, 10 min, 11 min, 12 min, 13 min, 14 min, 15 min, 20 min, 25 min, 30 min, 35 min, 40 min, 45 min, 50 min, 55 min, or 1 hr. The predefined period of time may be at most, or at most about, 10 sec, 20 sec, 30 sec, 40 sec, 50 sec, 1 min, 70 sec, 80 sec, 90 sec, 100 sec, 110 sec, 2 min, 130 sec, 140 sec, 150 sec, 160 sec, 170 sec, 3 min, 3.5 min, 4 min, 4.5 min, 5 min, 5.5 min, 6 min, 6.5 min, 7 min, 7.5 min, 8 min, 8.5 min, 9 min, 9.5 min, 10 min, 11 min, 12 min, 13 min, 14 min, 15 min, 20 min, 25 min, 30 min, 35 min, 40 min, 45 min, 50 min, 55 min, or 1 hr.

In some embodiments, the pore plate with an activated and cleaned surface ready for surface functionalization (subsequent to step 1115) may then be coated with one or a plurality of surface modification materials (step 1117). The one or more surface modification materials may comprise one or more polymers. The one or more surface modification materials may comprise one or more hydrophilic materials (such as one or more hydrophilic oligomers or one or more hydrophilic polymers), one or more hydrophobic materials (such as one or more hydrophobic oligomers or one or more hydrophobic polymers), or any combination thereof.

In some embodiments, part of the vertical sidewall of the pore plate (e.g. sidewalls of pore 113) may be functionalized with a hydrophilic oligomer or polymer such as polyethylene glycol (PEG), poly(hydroxyethyl methacrylate) (PHEMA), polyacrylamide (PAM), polyacrylic acid (PAA), polyvinylpyrrolidone (PVP), polysaccharide, polylactic acid (PLA), etc. The hydrophilic oligomer or polymer may be linear or branched. The hydrophilic oligomer or polymer may comprise a first end group. The hydrophilic oligomer or polymer comprising the first end group may comprise a second end group. One of the first and second end groups may be configured to react with, or form a self-assembly layer on, the activated and cleaned surface (subsequent to step 1117), and the other of the first and second end groups, if present, may be configured to remain on the hydrophilic oligomer or polymer after surface functionalization. The first or second end group, configured to remain on the hydrophilic oligomer or polymer after surface functionalization, may be alkoxy (e.g., methoxy, ethoxy), hydroxyl, amine, or an ionic hydrophilic group. The first or second end group, configured to react with, or form a self-assembly layer on, the activated and cleaned surface (subsequent to step 1117), may be selected from silane, thiol, primary amine (—$NH_2$), carboxylic acid (—COOH), aldehyde, vinyl, epoxy, and chloro. The first or second end group, configured to react with, or form a self-assembly layer on, the activated and cleaned surface (subsequent to step 1117), may be silane or thiol. Subsequent to step 1117, the vertical sidewall of the pore plate may be functionalized by a hydrophilic oligomer or polymer (such as Poly (Ethylene-glycol) (PEG)) end-capped with an alkoxy group (such as methoxy). The hydrophilic oligomer or polymer having a first end and a second may be functionalized PEG, such as silane-PEG-methoxy (PEG-silane) or thiol-PEG-methoxy (PEG-SH).

In some embodiments, the hydrophilic oligomer or polymer (such as the PEG-silane or PEG-SH) has a molecular weight of, or of about, 250, 500, 750, 1000, 1250, 1500, 1750, 2000, 2250, 2500, 2750, 3000, 3250, 3500, 3750, 4000, 4250, 4500, 4750, 5000, 5250, 5500, 5750, or 6000 Dalton, or any range between any two of the foregoing values. In some embodiments, the hydrophilic oligomer or polymer (such as the PEG-silane or PEG-SH) has a molecular weight of at least, or at least about, 250, 500, 750, 1000, 1250, 1500, 1750, 2000, 2250, 2500, 2750, 3000, 3250, 3500, 3750, 4000, 4250, 4500, 4750, 5000, 5250, 5500, 5750, or 6000 Dalton. In some embodiments, the hydrophilic oligomer or polymer (such as the PEG-silane or PEG-SH) has a molecular weight of at most, or at most about, 250, 500, 750, 1000, 1250, 1500, 1750, 2000, 2250, 2500, 2750, 3000, 3250, 3500, 3750, 4000, 4250, 4500, 4750, 5000, 5250, 5500, 5750, or 6000 Dalton. In some embodiments, the PEG-silane used in step 1117 may be a solution, e.g. 0.5 g/100 mL PEG-Silane dissolved in an alcohol, e.g. ethanol. In some embodiments, the functionalized PEG may comprise a Methoxy-Poly (Ethylene-glycol)-Thiol (PEG-SH). In some embodiments, the PEG-SH may be a solution, e.g. 0.5 g/100 mL PEG-SH dissolved in an alcohol, e.g. anhydrase ethanol. In some embodiments, the hydrophilic oligomer or polymer (such as the functionalized PEG) can be configured to reduce the non-specific binding, e.g. sticking, of charged particles, e.g. cells, to different surfaces of the pore plate 113. The Silane group present in PEG-Silane may promote selective affinity for the glass surfaces of the pore plate. The Thiol group present in PEG-SH may promote selective affinity for the pore plate surfaces coated with transition metals, e.g. Ti—Au. In some embodiments, PEG-SH may adhere specifically to the metal coated portions of the substrate 110, e.g. Ti—Au. In some embodiments, PEG-Silane may adhere specifically to the glass portions of the substrate 110 which does not have any metal coating.

Figure 12A:
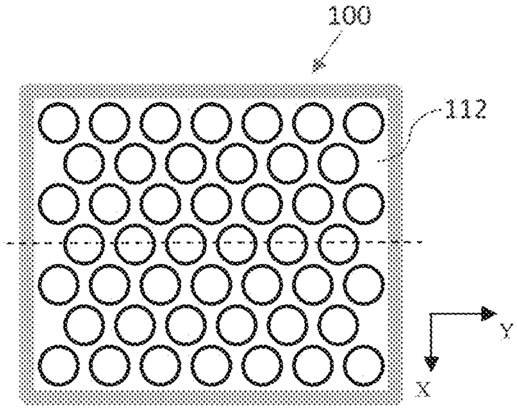
FIG. 12A is a top view of an array for sorting particles, in accordance with some embodiments.
Figure 12B:
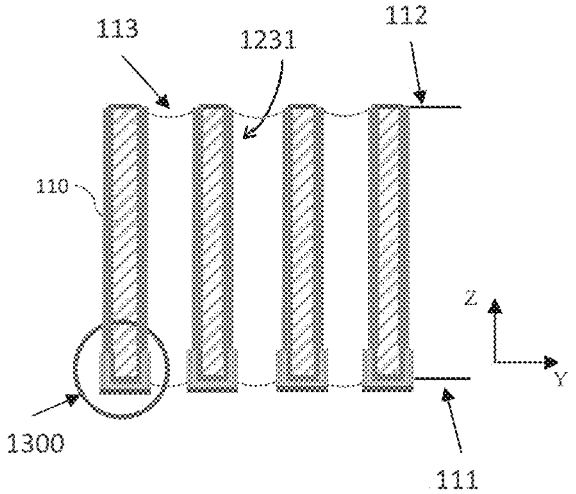
FIG. 12B shows a cross-sectional view of an array with surface modifications at the bottom end of the array, in accordance with some embodiments.

FIG. 12A shows a top view of the array 100 and FIG. 12B shows a cross-sectional view of the array, in accordance with some embodiments. FIG. 12B illustrates that the one or more surface modification materials (such as the one or more hydrophilic materials) may be added to a first portion and a second portion of the substrate 110. In some embodiments, the first portion may be the top portion of the substrate 110, which is the portion closer to the surface 112. In some embodiments, the second portion may be the bottom portion of the substrate 110, which is the portion closer to the surface 111. In some embodiments, the first portion of the substrate 110 (e.g., the part of the vertical sidewalls not covered by 1320/1322 in FIG. 13B) may be coated with a material 1231 to modify the surface properties of the substrate 110. The surface material 1231 may comprise a hydrophilic material, such as a hydrophilic oligomer or polymer (such as a functionalized PEG), as described hereinabove. In some embodiments, the surface material 1231 may be a functionalized PEG, e.g. PEG-Silane (such as described hereinabove with respect to FIG. 11 or described anywhere else herein). In some embodiments, the functionalized PEG may reduce the non-specific binding, e.g. sticking, of charged particles, e.g. cells, to the walls of the pores 113. In some embodiments, the Silane group in the PEG-Silane may be used to modify the surface properties of the glass portion of the substrate 110. In some embodiments, the second portion (bottom portion) of the substrate 110 may be coated with a plurality of materials 1300, as described in more detail with reference to FIGS. 13A-13D.

FIGS. 13A-13D illustrate an example process for forming a multilayer coating 1300 (see FIG. 13D) on the bottom portion of the substrate 110 (such as described hereinabove with respect to FIG. 11 or described anywhere else herein). In some embodiments, the multilayer coating 1300 may enhance or modify the surface properties of the substrate 110. Additionally, the multilayer coating 1300 can in some instances peel off and concurrently disrupt a meniscus of a liquid held in the micropore array. In some embodiments, the multilayer coating 1300 or at least one or more portions of the coating 1300 may be disrupted using electromagnetic radiation, e.g. laser.

In some embodiments, a first layer 1320 may be formed on the surface of the substrate 110, as illustrated in FIG. 13B. In some embodiments, the first layer may comprise a transition metal, e.g. Au, Ti, or Cr. Optionally, in some embodiments, a second layer 1322 may be formed on the first layer 1320, as illustrated in FIG. 13C. In some embodiments, the second layer may be a different material from the first layer. In some embodiments, the second layer may comprise a noble metal, e.g. Au. The first layer may in some embodiments facilitate the adhesion of at least one or more subsequent layers of coating materials to the substrate. In some embodiments, the first layer may be titanium which can facilitate adhesion of a second layer of a different coating material, e.g. gold. In some embodiments, the second layer, e.g. gold, may be coated with other materials, e.g. polymers. As an example, thiol (—SH) group has a high affinity for gold. In some embodiments, the second layer, e.g. gold, may be amenable to surface functionalization, e.g. by using a thiol (—SH) derivate of a functional surface coating material, e.g. PEG-SH.

Subsequently, as shown in FIG. 13D, a third layer 1332 may be formed covering a vertical sidewall portion (e.g. extending along the Z-axis) of the pores. The vertical sidewall portion may comprise the first layer 1320 and/or the second layer 1322 (such as described hereinabove with respect to FIG. 11 or described anywhere else herein). The first and/or second layers 1320/1322 may comprise a Ti layer, a Ti—Au stack, or a Au layer. In some embodiments, the third layer 1332 may comprise a polymer. In some embodiments, the polymer may comprise PEG, or a derivative of PEG, e.g. PEG-Thiol. The Thiol group present in PEG-SH may promote selective affinity for the pore plate surfaces coated with metals, e.g. Ti—Au. In some embodiments, the functionalized PEG may reduce the non-specific binding, e.g. sticking, of charged particles, e.g. cells, to the walls of the pores 113.

In some embodiments, as shown in FIG. 13D, a fourth layer 1333 may be formed covering a bottom portion of the substrate on the first layer 1320 and/or second layer 1322. The bottom portion may be adjacent to the vertical sidewalls of the pores. The fourth layer 1333 may extend, along the Y-axis as shown in FIG. 13D. In some embodiments, the fourth layer 1333 may comprise an oligomer or polymer. In some embodiments, the fourth layer may comprise a hydrophobic oligomer or polymer, such as a fluorinated or perfluorinated oligomer or polymer. The fluorinated or perfluorinated oligomer or polymer may be formed from monomers selected from the group consisting of fluorinated dioxoles, fluorinated dioxolanes, fluorinated cyclically polymerizable alkyl ethers, and combinations thereof. The fluorinated or perfluorinated oligomer or polymer may be a perfluoroalkylthiol, such as perfluorohexanethiol, perfluorooctanethiol, or perfluorodecanethiol. The fluorinated or perfluorinated oligomer or polymer may comprise 1H,1H,2H,2H-Perfluorodecanethiol (PF-SH). The thiol group present in PF-SH may have a high affinity for the previous coating layer, e.g. gold. The hydrophobic oligomer or polymer may be linear or branched. The hydrophobic oligomer or polymer may comprise a first end group. The hydrophobic oligomer or polymer comprising a first end group may comprise a second end group. One of the first and second end groups may be configured to react with, or form a self-assembly layer (such as a monolayer) on, the activated and cleaned surface (subsequent to step 1117), and the other of the first and second end groups, if present, may be configured to remain on the hydrophobic oligomer or polymer after surface functionalization. The first or second end group, configured to react with, or form a self-assembly layer on, the activated and cleaned surface, may be selected from silane, thiol, primary amine (—$NH_2$), carboxylic acid (—COOH), aldehyde, vinyl, epoxy, and chloro. The first or second end group, configured to react with, or form a self-assembly layer on, the activated and cleaned surface (subsequent to step 1117), may be thiol. The hydrophobic oligomer or polymer (such as a fluorinated or perfluorinated oligomer or polymer) may have a molecular weight of, or of about, 250, 480, 500, 750, 1000, 1250, 1500, 1750, 2000, 2250, 2500, 2750, 3000, 3250, 3500, 3750, 4000, 4250, 4500, 4750, 5000, 5250, 5500, 5750, or 6000 Dalton, or any range between any two of the foregoing values. The hydrophobic oligomer or polymer (such as a fluorinated or perfluorinated oligomer or polymer) may have a molecular weight of at least, or at least about, 250, 480, 500, 750, 1000, 1250, 1500, 1750, 2000, 2250, 2500, 2750, 3000, 3250, 3500, 3750, 4000, 4250, 4500, 4750, 5000, 5250, 5500, 5750, or 6000 Dalton. The hydrophobic oligomer or polymer (such as a fluorinated or perfluorinated oligomer or polymer) may have a molecular weight of at most, or at most about, 250, 480, 500, 750, 1000, 1250, 1500, 1750, 2000, 2250, 2500, 2750, 3000, 3250, 3500, 3750, 4000, 4250, 4500, 4750, 5000, 5250, 5500, 5750, or 6000 Dalton. In some embodiments, the hydrophobic surface coating may form a self-assembled monolayer (SAM). In some embodiments, the self-assembled monolayer may reduce the wettability. In some embodiments, the self-assembled monolayer may reduce surface energy. In some embodiments, the hydrophobic surface coating, e.g. PF-SH, may have a water contact angle about 120°. In some embodiments the hydrophobic surface coating, e.g. PF-SH, may have a water contact angle of 90° to 150°. In some embodiments the hydrophobic surface coating, e.g. PF-SH, may have a water contact angle of 100°, 105°, 110°, or 115°. In some embodiments, the hydrophobic coating can be used as sealant. In some embodiments, the sealant may prevent leakage from the pore endings on the surface 111. In some embodiments, the thiol group may improve the adhesion of the hydrophobic coating, e.g. PF-SH, to the underlying surface, e.g. Au in the Ti—Au.

In some embodiments, the surface materials 1320 and/or 1322 (such as described hereinabove with respect to FIG. 11 or described anywhere else herein) may be applied to the surface of the substrate 110 by metal sputtering. In some embodiments, the thickness of the surface materials 1320 and/or 1322 may be between 10 nm to 1000 nm. In some embodiments, the thickness of the surface materials 1320 and/or 1322 may be at least 10 nm, 20 nm, 30 nm, 40 nm, 50 nm, 100 nm, 200 nm, 300 nm, 400 nm, 500 nm, 600 nm, 800 nm, 1000 nm, or more. In some embodiments, the thickness of the surface materials 1320 and/or 1322 may be at most about 1000 nm, 800 nm, 600 nm, 500 nm, 400 nm, 300 nm, 200 nm, 100 nm, 50 nm, 40 nm, 30 nm, 20 nm, 10 nm, or less.

In some embodiments, the sputtering can be performed under a vacuum. In some embodiments, the vacuum can be about 0.08 to about 0.02 mbar. In some embodiments, the vacuum may be at most about 0.01 mbar, 0.02 mbar, 0.03 mbar, 0.04 mbar, 0.05 mbar, 0.06 mbar, 0.07 mbar, 0.08 mbar, 0.09 mbar, 0.1 mbar, or less. In some embodiments, the vacuum may be at least about 0.1 mbar, 0.09 mbar, 0.08 mbar, 0.07 mbar, 0.06 mbar, 0.05 mbar, 0.04 mbar, 0.03 mbar, 0.02 mbar, 0.01 mbar, or more. In some embodiments, the sputtering can be performed under a voltage of about 100 V to 3 kV. In some embodiments, the voltage may be at least about 100 V, 110 V, 130 V, 150 V, 170 V, 220 V, 280 V, 500 V, 1000 V, 2000 V, 3000 V, or more. In some embodiments, the voltage may be at most about 3000 V, 2000 V, 1000 V, 500 V, 280 V, 220 V, 170 V, 150 V, 130 V, 110 V, 100 V, or less. In some embodiments, the sputtering can be performed under an electric current: 0 to 50 mA. In some embodiments, the electric current may be at least about 0.01 mA, 0.1 mA, 1 mA, 5 mA, 10 mA, 20 mA, 30 mA, 40 mA, 50 mA, or more. In some embodiments, the electric current may be at most about 50 mA, 40 mA, 30 mA, 20 mA, 10 mA, 1 mA, 0.1 mA, 0.01 mA, or less. In some embodiments, the surface material can be sputtered on one or both sides of the glass array (e.g. the top and/or the bottom of the plate).

Also provided herein is a method of forming an infrared absorbing bead. In some embodiments, the method comprises: washing Agarose beads; dying the Agarose beads; and forming the core of the Agarose beads. In some embodiments, washing Agarose beads comprises suspending the Agarose beads in a first solvent and centrifuging the Agarose beads and the first solvent. In some embodiments, the first solvent comprises an organic solvent, e.g., acetone, or aqueous solvent, e.g., water or a combination thereof. In some embodiments, the centrifuging can be performed at a rate of about 1,000 rpm to about 4,000 rpm. In some embodiments, the centrifuging can be performed at a rate of about 2,000 rpm. In some embodiments, 1 mL of the first solvent can be used for every 50 mg of the Agarose beads. In some embodiments, the Agarose beads comprise Superdex beads.

In some embodiments, dying the Agarose beads comprises forming a dying solution, centrifuging the dying solution, and adding the dying solution to the Agarose beads. The dying solution may comprise Epolin 1178 and a second solvent. In some embodiments, the second solvent comprises acetone, water, deionized water, or any combination thereof. The centrifuging may be performed at a rate of about 2,000 rpm to about 10,000 rpm, e.g., about 5,000 rpm. In some embodiments, dying the Agarose beads further comprises incubating the Agarose beads and the dying solution. The incubation may be performed for about 15 minutes to about 1 hour, e.g., about 30 minutes. In some embodiments, the incubation can be performed at room temperature. The incubation may be performed with constant mixing. In some embodiments, dying the Agarose beads further comprises centrifuging the Agarose beads after incubation, e.g., at a rate of about 750 rpm to about 3,000 rpm. In some embodiments, dying the Agarose beads further comprises separating the dark beads from the light beads. In some embodiments, dying the Agarose beads further comprises suspending the Agarose beads in 0.2 percent BSA-PBS.

In some embodiments, forming the core of the Agarose beads comprises suspending the Agarose beads in a third solvent and centrifuging the Agarose beads and the third solvent. In some embodiments, the third solvent comprises a 1:1 acetone-water mixture. In some embodiments, the centrifuging can be performed at a rate of about 500 rpm to about 2,000 rpm. In some embodiments, the centrifuging can be performed for about 10 seconds to about 60 seconds.

Alternatively, in some embodiments forming the core of the Agarose beads comprises incubating the beads in a buffer. In some embodiments, the buffer comprises BSA-PBS. In some embodiments, the buffer has a concentration of about 0.2 percent. In some embodiments, incubating the beads in a buffer can be performed at a temperature of about 4° C. In some embodiments, incubating the beads in a buffer can be performed for a period of time of at least about 5 days. Forming the core of the Agarose beads may further comprise changing the buffer each day.

Provide herein is a solution comprising a plurality of beads as described herein and a particle of interest as described herein. In some cases, the particle of interest is a cell. In some cases, the solution comprises a ratio of a number of the plurality of beads to a number of a plurality of cells, which is about 1:1 to 10:1. The solution comprising the particle of interest may be inserted into one or a plurality of pores of an array as described herein. Example solutions are described further with respect to examples five and six.

System

Another aspect provided herein is a system for sorting particles. Provided herein is a system for sorting components of a mixture. The system may comprise any embodiment, variation, or example of the array as described herein.

Figure 14A:
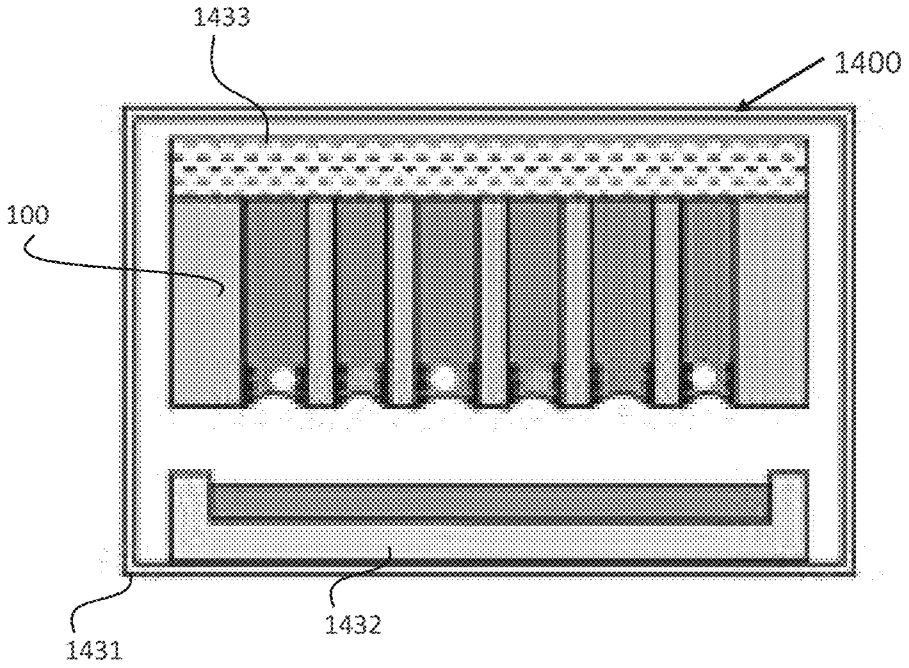
FIG. 14A shows a side cross-sectional view of a system comprising an array, a housing, and an internal surface, in accordance with some embodiments.

FIG. 14A, shows a system comprising array 100, a housing 1431, and an internal surface 1432. The system for sorting particles may comprise an array 100 comprising: a substrate 110 comprising: a first surface 111; a second surface 112 opposite the first surface 111; and a plurality of pores 113 extending from the first surface 111 to the second surface 112, each of the pores 113 comprising a cross sectional area equal to or less than about one square millimeter and a length equal to or less than about 10 mm, wherein the substrate 110 comprises a first material; and a coating 120 operably coupled to the second surface 112, wherein the coating 120 comprises a second material different from the first material, and wherein a portion of the coating 120 can be configured to be disrupted from the second surface 112 in response to electromagnetic radiation being directed at the portion of the coating 120; and a fluid within the plurality of pores 113 of the array 100, wherein a meniscus of fluid within the plurality of pores 113 are substantially adjacent the coating 120.

In some embodiments, the first surface 111 or the second surface 112 can be hydrophilic. In some embodiments, the first surface 111 or the second surface 112 can be coupled to a hydrophilic coating 120. In some embodiments, the coating 120 can be hydrophobic. In some embodiments, the coating 120 can be capable of preventing leakage from the pores for a period equal to or greater than 1 hour. In some embodiments, the coating 120 covers the first surface 111 or the second surface 112 in its entirety.

In some embodiments, the surface coating material can be titanium. In some embodiments, the surface coating material comprises silver, gold, aluminum, copper, platinum, nickel, or cobalt. In some embodiments, the substrate material can be glass. In some embodiments, the cross-sectional area can be equal to or less than about 0.03 $mm^2$. In some embodiments, the length can be equal to or less than about 1.5 mm. In some embodiments, the coating 120 comprises a thickness equal to or less than about 200 nm. In some embodiments, the substrate 110 comprises a surface area to volume ratio of about 0.5 $m^{-1}$. In some embodiments, the portion of the coating 120 can be configured to absorb the electromagnetic radiation and break off from the second surface 112 in response to electromagnetic radiation being directed at the portion of the coating 120. In some embodiments, the plurality of micropores 113 is orthogonal to the first surface 111 and the second surface 112. In some embodiments, the plurality of micropores 113 is substantially parallel to each other. In some embodiments, the plurality of micropores 113 is from about 1 million to about 100 billion micropores 113. In some embodiments, the second material is opaque. The second material may be configured to absorb infrared (IR) energy. The substrate 110 and the coating 120 may comprise different thermal expansion coefficients.

Optionally, the system may additional comprise a housing 1431 comprising an internal surface 1432 configured to receive selected contents released from the array. The system may comprise any embodiment, variation, or example of the array as described herein and a housing comprising an internal surface. The internal surface may be positioned below the second surface of the substrate. The system may additionally comprise a cell sorter. The array be mounted on the cell sorter.

Optionally, the system for sorting particles may comprise a source of electromagnetic radiation.

Figure 14B:
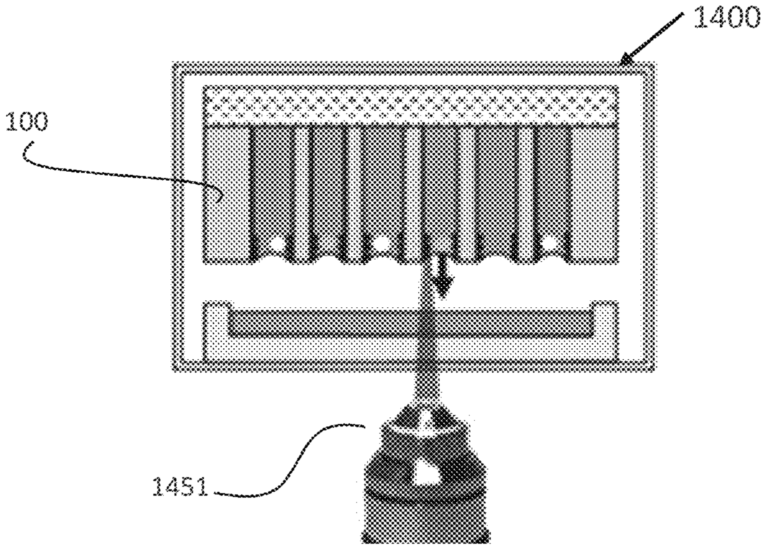
FIG. 14B shows a side cross-sectional view of a system comprising an array, a housing, an internal surface, and a source of electromagnetic radiation, in accordance with some embodiments.

FIG. 14B shows a system for sorting particles comprising an array 100 and a source of electromagnetic radiation 1451. The array can be configured to be disrupted at the first surface or the second surface in response to electromagnetic radiation being directed at a portion of the first or the second surface. In some instances, it can be beneficial for sorting systems to be able to release particles held in a particular compartment of an array without directing lasers or other energy sources directly at the compartment holding the particles of interest, e.g., for helping increase cell viability when the particles of interest are cells. Focusing the laser energy at the surface of the array rather than the interior of a pore in the array may avoid, or reduce, possible damage to the pore contents from thermal shock, thermal expansion, micro-bubble generation, and localized sheer stress.

The source of generating electromagnetic radiation may comprise a laser. The laser may be a doped solid state laser. The laser may be a fiber laser. The laser may be a semiconductor diode laser. The laser may be a gas laser, such as a HeNe laser or an eximer laser. The laser may emit electromagnetic radiation within a range of wavelengths. In some embodiments, the electromagnetic radiation may be emitted in the visible and/or infrared. The electromagnetic radiation may be emitted within a 5 nanometer band with then visible or infrared. The electromagnetic radiation may be emitted at a harmonic of a doped solid state laser such as doped Ytterbium Orthovanadate or Ytterbium Aluminum Garnet. The electromagnetic radiation may comprise 1064 nm radiation.

The electromagnetic radiation may comprise an incident energy. The incident energy may be greater than 0.1 microJoules per pulse. The incident energy may be less than 1 milliJoule per pulse. The incident energy may be within a range from 1 picoJoule to 1 Joule per pulse. The average power may be less than 10 Watts. The average power may be less than 100 milliWatts. The average power may be greater than 1 microWatt.

The electromagnetic radiation may comprise an incident peak power density. The peak power density may be less than 10 Terawatt per centimeter squared. The peak power may be less than 10 GigaWatts per centimeter squared.

The electromagnetic radiation may comprise an incident spot diameter. The spot diameter may be sufficiently small such that an area adjacent the pore may be irradiated without significantly irradiating the contents of the cell. The spot diameter may be adjusted based on the size of the pores and the pore spacing. The spot diameter may be sufficiently small that an interior wall of the pore lumen may be irradiated without significant irradiation of the pore contents, such as a cell in the interior of the lumen. The spot diameter may be less than 10 millimeter (mm), less than 1 mm, less than 100 micron (μm), less than 10 μm, or less.

The electromagnetic radiation may comprise an incident pulse duration. The pulse duration may be greater than about 5 femtoseconds. The pulse duration may be greater than about 100 femtoseconds. The pulse duration may be greater than about one nanosecond or more. The pulse duration may be less than about 1 microsecond.

An example source of electromagnetic radiation comprises a 1064 nm, Ytterbium fiber laser, with a power of 0.1 mJ, a power density of $10^8$-$10^9$ W/$mm^2$, whereby a spot diameter 20 μm at 10 percent-30 percent of maximum laser power with a 4 ns pulse duration is capable of providing 30-90 J/$cm^2$ to the array.

The system may additionally comprise one or a plurality of lenses for focusing a source of electromagnetic radiation. The one or a plurality of lenses may comprise a microscope objective. The microscope objective may be raster scanned across the surface of the array in order to target a particular portion of the array. The system may comprise one or more translation stages which may control the positioning of the objective relative to the surface of the array.

The system may comprise one or more beam splitters, filters, or dichroic filters. The system the one or more beam splitter, filters, or dichroic filters may allow for a user to monitor the surface of the array while aligning or direct a source of electromagnetic radiation toward a surface of the array. The alignment may be done a lower power electromagnetic radiation than would disrupt the array or at the same power. The system may comprise one or more position sensitive optical detectors, such as a CCD, in order to monitor an alignment of the source of electromagnetic radiation.

The system may comprise a second source of electromagnetic radiation. The second source of electromagnetic radiation may be used for alignment. The second source of electromagnetic radiation may be used to excite an absorber, such as a fluorophore. The second source of electromagnetic radiation may be coherent or incoherent. The second source of electromagnetic radiation may be broad band or narrow band. The second source of electromagnetic radiation may comprise any property described herein with respect to a source of electromagnetic radiation, such as power, pulse duration, wavelength, etc.

Figure 15A:
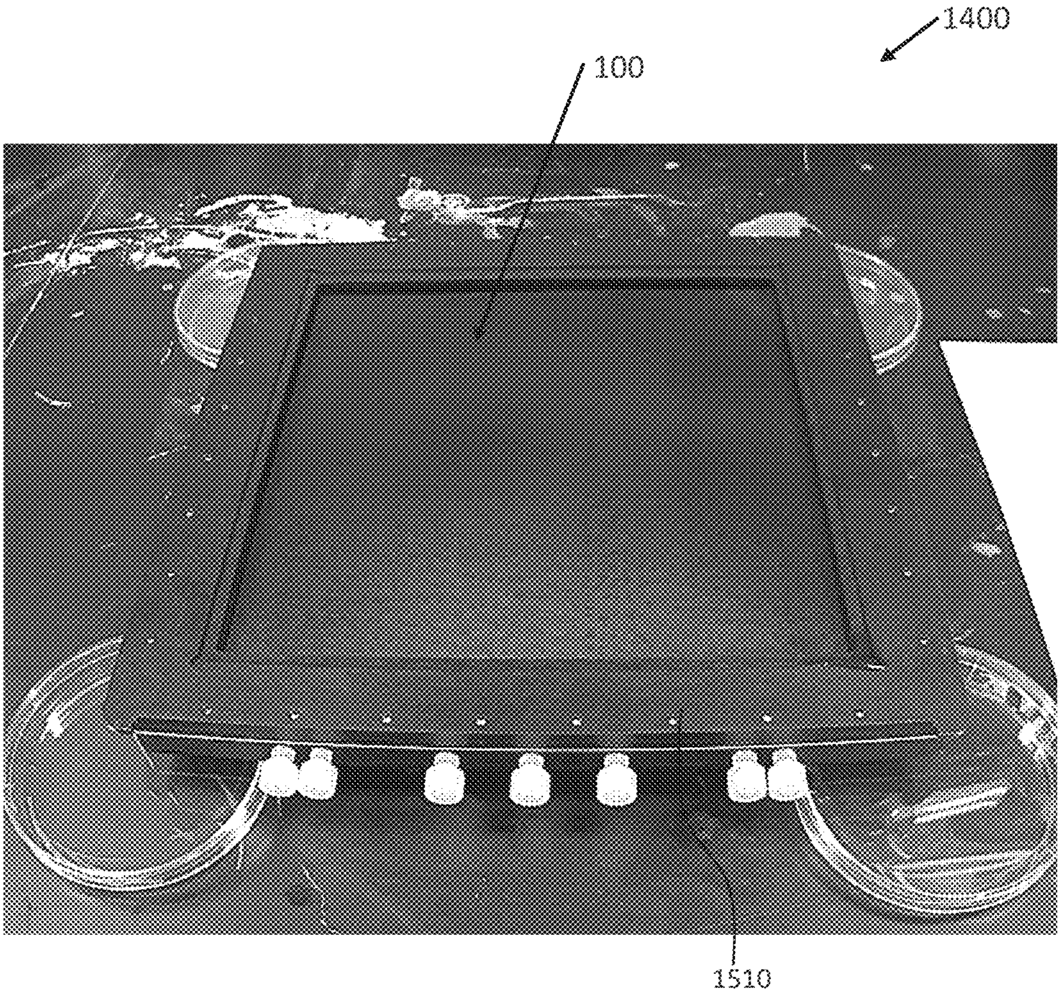
FIG. 15A is an orthogonal initial view of a leak test of an example system at 0 hours, in accordance with some embodiments.
Figure 15B:
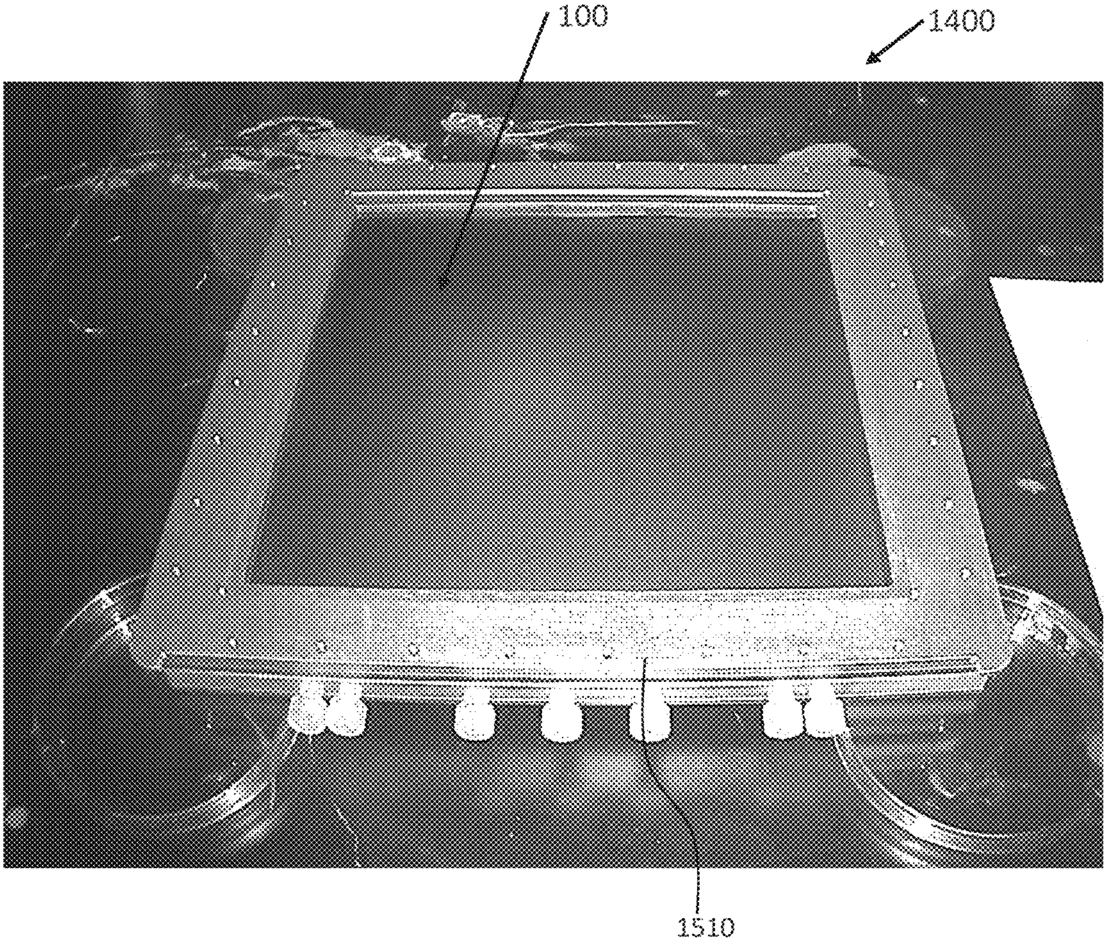
FIG. 15B is an orthogonal final view of a leak test of an example system at 5 hours, in accordance with some embodiments.

FIG. 15A and FIG. 15B show an example system 1400 comprising an array and a housing. FIG. 15A is a top initial view of a leak test at 0 hours. FIG. 18B is a top initial view of a leak test of an example array at 5 hours. Per FIG. 15A to FIG. 15B, a leak test of an example array 100 in a frame 1510 was performed with deionized water over a period of about 5 hours, wherein none of the deionized water leaked through the micropores of the array. In some embodiments, the coating of the example array 100 can be capable of preventing leakage from the pores for a period equal to or greater than about 1 hour. In some embodiments, the coating of the example array 100 can be capable of preventing leakage from the pores for a period equal to or greater than about 1 hour, 2 hours, 3, hours, 4 hours, 5, hours, 6 hours, 7 hours, 8 hours, 9 hours, or 10 hours.

Methods

The embodiments, examples, and variations of an array described herein can be utilized in a method for releasing particles from a pore of the array. The embodiments, examples, and variations of a system described herein can be utilized in a method for releasing particles from a pore of the array. Provided herein is a method of releasing particles from a pore of an array, the method comprising: filling the pore, holding the portion of the solution in the pore, directing electromagnetic radiation at a portion of the array, disrupting the portion of the array, and releasing the portion of the solution comprising the particle of interest. The pore can be filled with at least a portion of a solution. The solution can comprise a particle of interest. The portion of the solution can be held in the pore via surface tension. Disrupting the portion of the array can disrupt the surface tension of the portion of the solution held in the pore.

Provided herein is a method of releasing selected contents from a pore of an array, the method comprising: identifying a pore of an array with selected contents, wherein the array comprises a substrate with a first surface and a second surface opposite the first surface, wherein the substrate comprises a substrate material and a surface material wherein the surface material is positioned at or adjacent to the first or second surfaces, and the substrate comprises a plurality of pores defining lumens extending from the first surface to the second surface, wherein the substrate is characterized by one or more of: (a) each pore of the plurality of pores has a largest diameter of 500 microns or less, (b) each pore of the plurality of pores has an aspect ratio of 10 or greater, (c) a pore density of 100 or greater pores per square millimeter, and (d) the surface material is selected from a material that absorbs greater than 10 percent of incident electromagnetic radiation, and removing a portion of the surface material from the first or second surface of the array with electromagnetic radiation directed to the surface material within or adjacent to the identified pore, thereby releasing the contents of the identified pore.

In some examples, the array may be characterized by two or more of: (a) each pore of the plurality of pores has a largest diameter of 500 microns or less, (b) each pore of the plurality of pores has an aspect ratio of 10 or greater, (c) a pore density of 100 or greater pores per square millimeter, and (d) the surface material is selected from a material that absorbs greater than 10 percent of incident electromagnetic radiation.

Figure 16A:
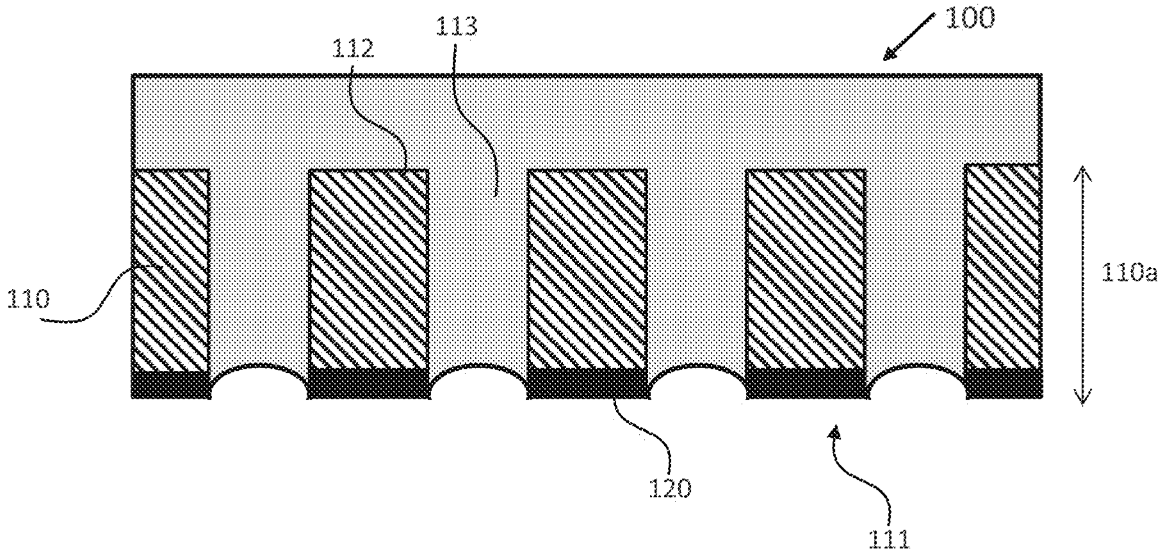
FIG. 16A shows a side cross-sectional view of providing an array comprising a plurality of pores, in accordance with some embodiments.

FIGS. 16A-16F show a side cross-sectional views of an example method of sorting cells with an example array of FIG. 1A, as described herein. Per FIGS. 16A-F, the example method 1600 of sorting cells with the example first array 100 comprises: providing 1610 an array 100 comprising a plurality of pores 113. In some embodiment, the operation 1610 may further comprise covering a portion of the pores 113 closest to the first surface 111 of the array 100 with microspheres, per FIG. 5A. An operation 1620 of the method 1600 may comprise depositing an aqueous solution 1621 within the array. In some cases, the array may comprise depositing a first cell 1622 and a second cell 1623 onto the first array 100, per FIG. 16B. An operation 1630 of the method 1600 may comprise inserting the array 100 within a housing 1631, per FIG. 16C. In some cases, the housing may comprise a cartridge. The housing may comprise and internal surface 1632. An operation 1640 of the method 100 may comprise capturing a plot of the signal the selected particles. The selected particles may comprise first cells 1622 and second cells 1623, per FIG. 16D. The method 1600 may further comprise locating 1640 a plot of the signal of first cells 1622 within the plot of the signal of first cells and the second cells 1623, per FIG. 16E. The method 1600 may further comprise extracting 1640 the second cell 1623 from the array 100; and collecting 1650 the second cell 1623 per FIG. 16F. The step of extracting the cell from the array may comprise disrupting a coating on at or near the surface of the array 100. The step of disrupting may comprise providing electromagnetic radiation to the surface of the array at selected location. FIG. 16A shows a side cross-sectioned view of providing an array comprising a plurality of pores comprising a coating, per the example method.

Figure 16B:
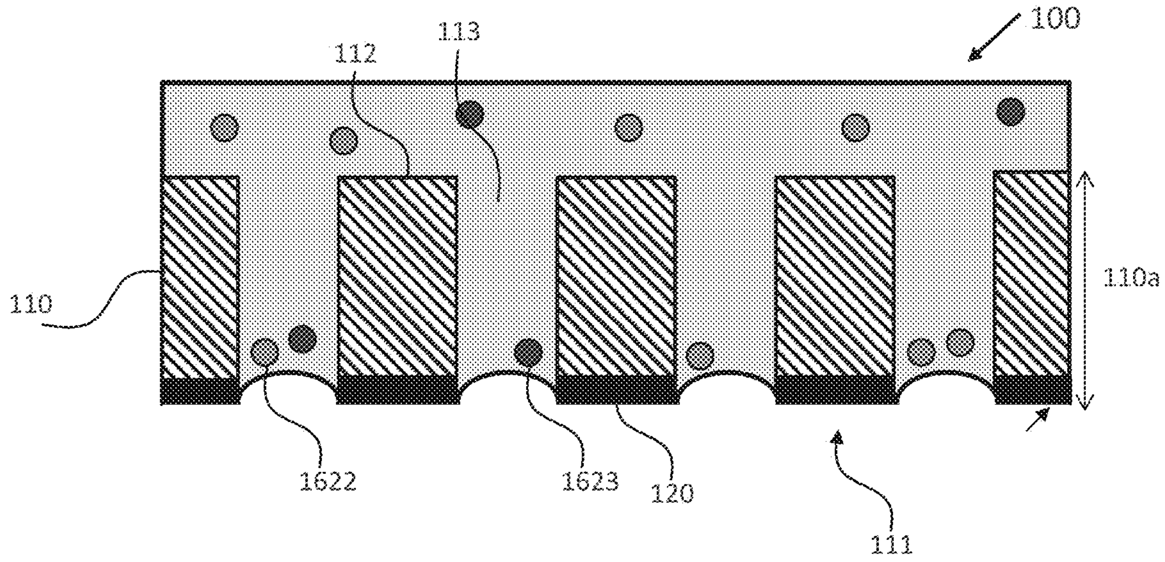
FIG. 16B shows a side cross-sectional view of depositing an aqueous solution within the array, in accordance with some embodiments.

FIG. 16B shows a side cross-sectional view of the depositing of an aqueous sample solution within the example array of FIG. 1. In some embodiments, depositing 1620 the aqueous sample solution 1621 onto the array 100 comprises spreading the aqueous sample solution 1621 onto the array 100. In some embodiments, the hydrophilic second surface 112 of the array 100 absorbs the aqueous sample solution 1621 into the pores 113. In some embodiments, the hydrophilic second surface 112 of the array 100 evenly distributes the first cells 1622 and the second cells 1623 within the aqueous sample solution 1621 among the pores 113. In some embodiments, the hydrophilic second surface 112 of the array 100 randomly distributes the first cells 1622 and the second cells 1623 within the aqueous sample solution 1621 among the pores 113. In some embodiments, the first cells 1622 and the second cells 1623 settle at the bottom of each pore 113. Optionally, in some embodiments, the first cells 1622 and the second cells 1623 are withheld in each pore 113 by the surface tension of the aqueous sample solution 1621. In some examples, the cells are selected from INKT cells, Tmem, Treg, HSPCs, and combinations thereof. The first surface 111 of the array 100 may be hydrophobic. For example, the bottom side of the pore plate can be coated with 1H,1H,2H,2H-Perfluorodecanethiol as hydrophobic layer to prevent pore plate leaking, as described elsewhere herein. The vertical sidewalls of the pores near the bottom of the pore plate can be coated with Methoxy-Poly (Ethylene-glycol)-Thiol to reduce cell stickiness, as described elsewhere herein.

Figure 16C:
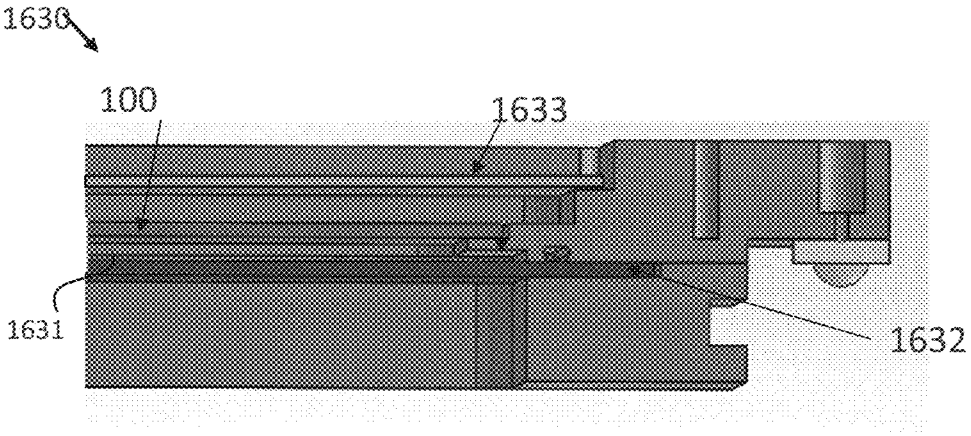
FIG. 16C shows a side cross-sectioned view of inserting the example array of FIG. 1A within a cartridge, in accordance with some embodiments.

FIG. 16C shows a side cross-sectional view of inserting the example array of FIG. 1A within a closed cartridge or housing, in accordance with some embodiments. Per FIG. 16C, the cartridge 1631 comprises a humidification membrane 1633 on top of the array 100 and a collection tray 1632 to collect the second cell 1623. Optionally, in some embodiments, the cartridge 1631 comprises a closed cartridge 1631. Optionally, in some embodiments, the cartridge 1631 comprises a humidity controlled cartridge 1631. Optionally, in some embodiments, the humidification membrane 1633 reduces evaporation from the pores 113. Optionally, in some embodiments, the collection tray 1632 can be placed below the array 100 within the cartridge 1631. Optionally, in some embodiments, the collection tray 1632 comprises a transparent collection tray 1632.

Figure 16D:
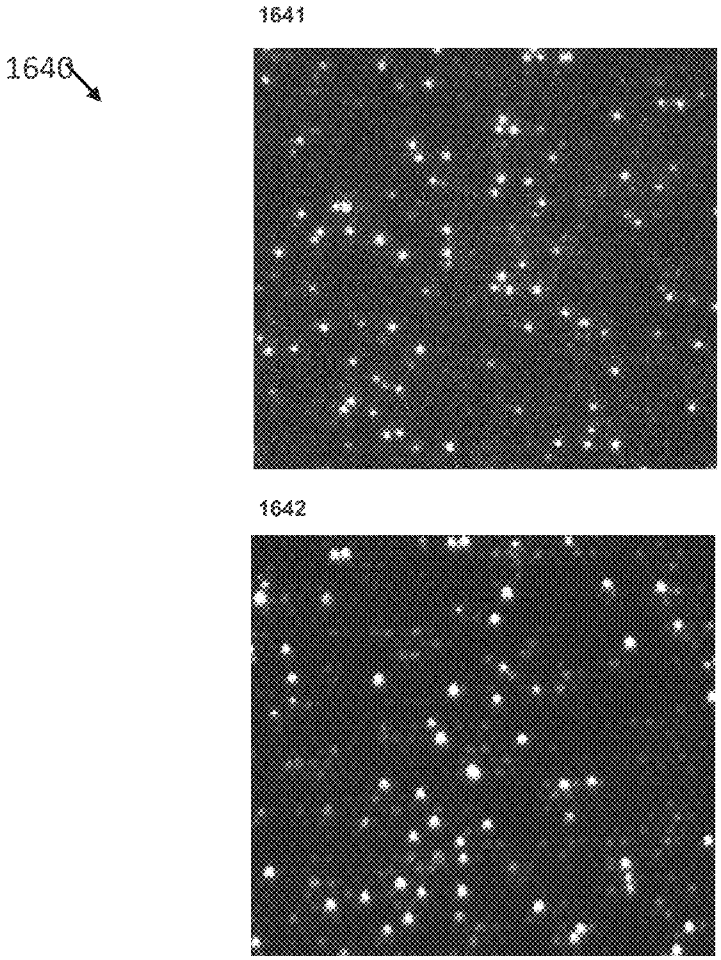
FIG. 16D shows an image of a plot of the signal of first cells and the second cells, in accordance with some embodiments.
Figure 17:
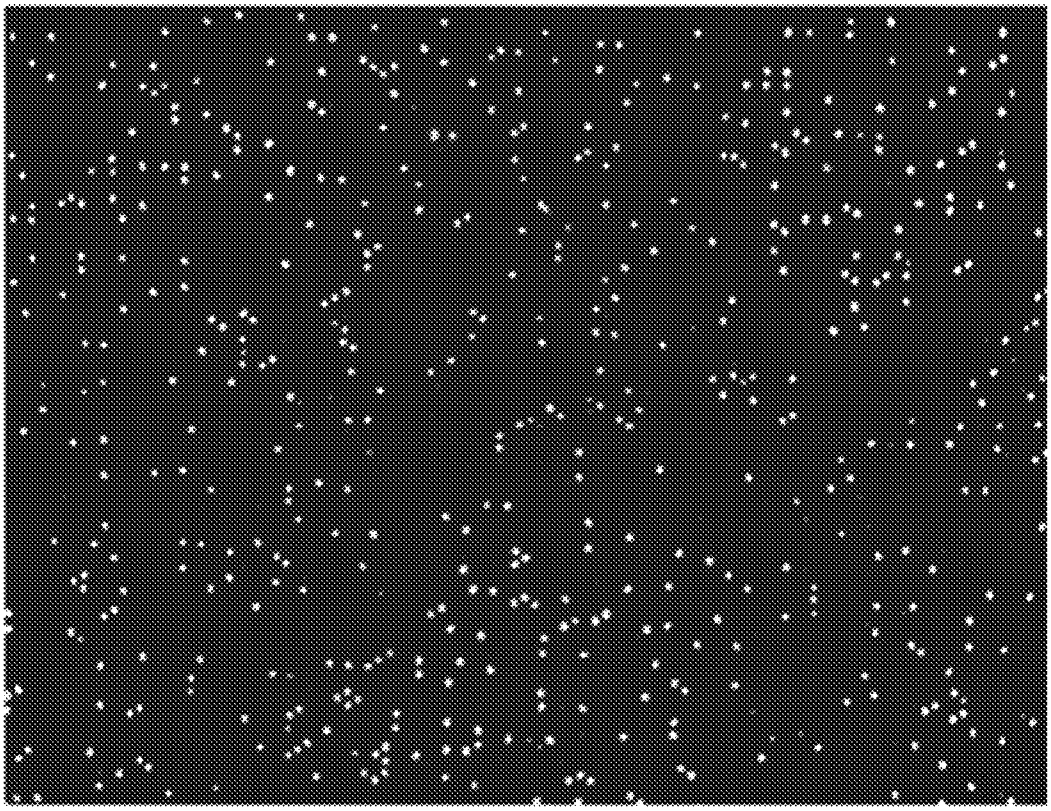
FIG. 17 shows an example raw fluorescent image of an array of cells, in accordance with some embodiments.
Figure 18:
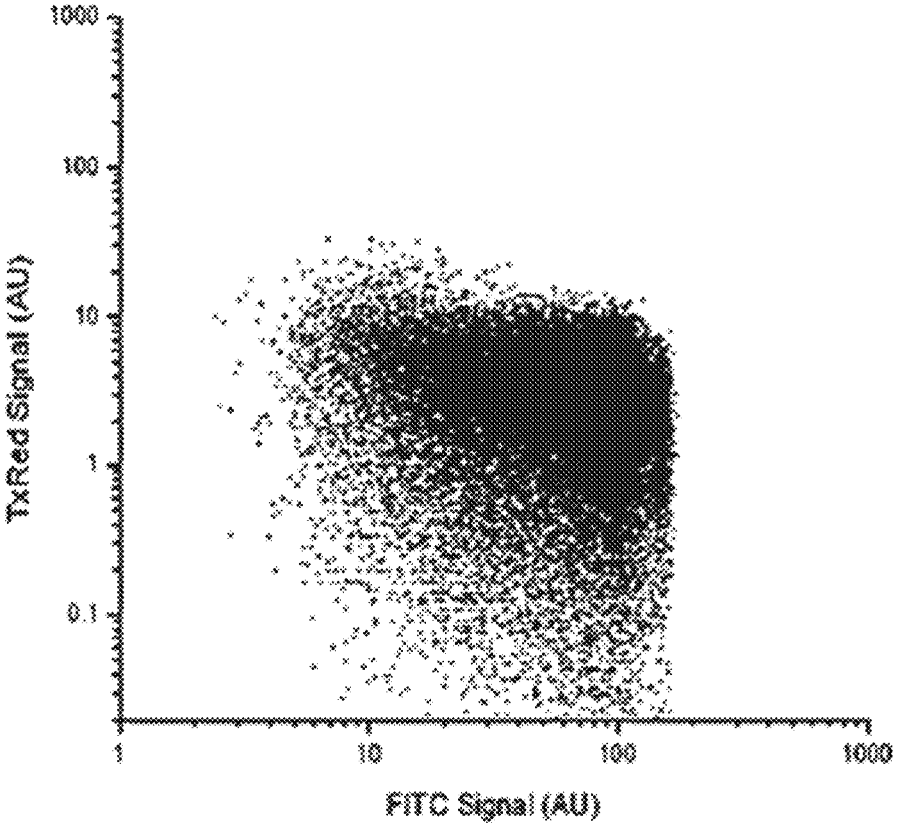
FIG. 18 shows an example scatter plot of 0.5 million pores of the array as represented in FIG. 17, in accordance with some embodiments.

FIG. 16D shows an image of plots of the signal of first cells and the second cells, in accordance with some embodiments. Per FIG. 16D, a plot 1641 of the signal of the second cells can be determined. In some embodiments, the plot of the signal of first cells 1642 can be determined. In some embodiments, the plots can be captured by quantifying an image taken by an automated fluorescent scanning system. The first cells may be fluorescent at a first wavelength and the second cells may be fluorescent at a second wavelength. In some embodiments, a combined image may be determined. FIG. 17 shows an example non-limiting raw fluorescent image of an array of cells. FIG. 18 shows an example non-limiting scatter plot 0.5 million micropores of the array as represented in FIG. 17.

Figure 16E:
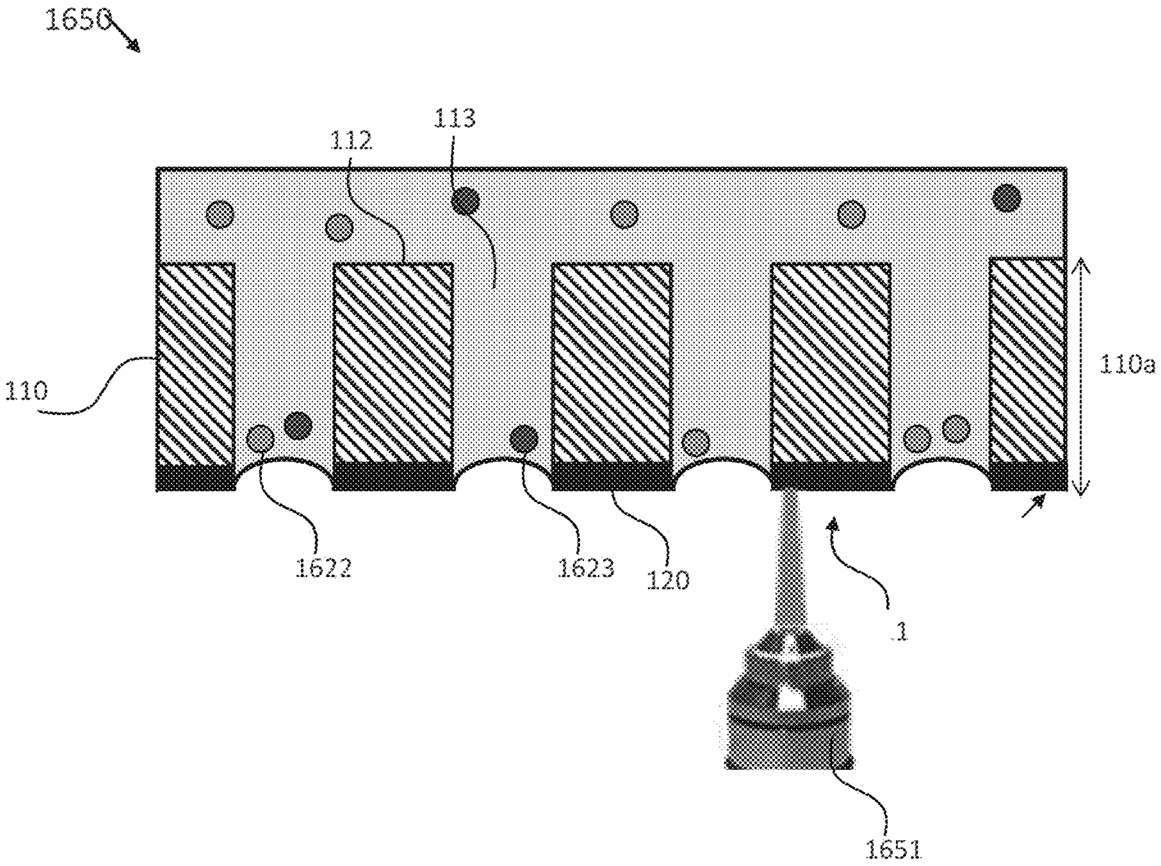
FIG. 16E shows a side cross-sectioned view of extracting the second cells, in accordance with some embodiments.

FIG. 16E shows a side cross-sectional view of extracting the second cells, in accordance with some embodiments. Per FIG. 16E, the second cells 1623 are extracted from the array 100 by exposing the pores 113 that, per the plot of the signal of the second cells 1623 in FIG. 16D, comprise the second cells 1623 to a pulse by a laser 1651. The laser excites the coating 120. In some embodiments, microspheres may be provided within a specific pore 113. Optionally, in some embodiments, the laser 1651 comprises a nanosecond laser 1651.

Figure 16F:
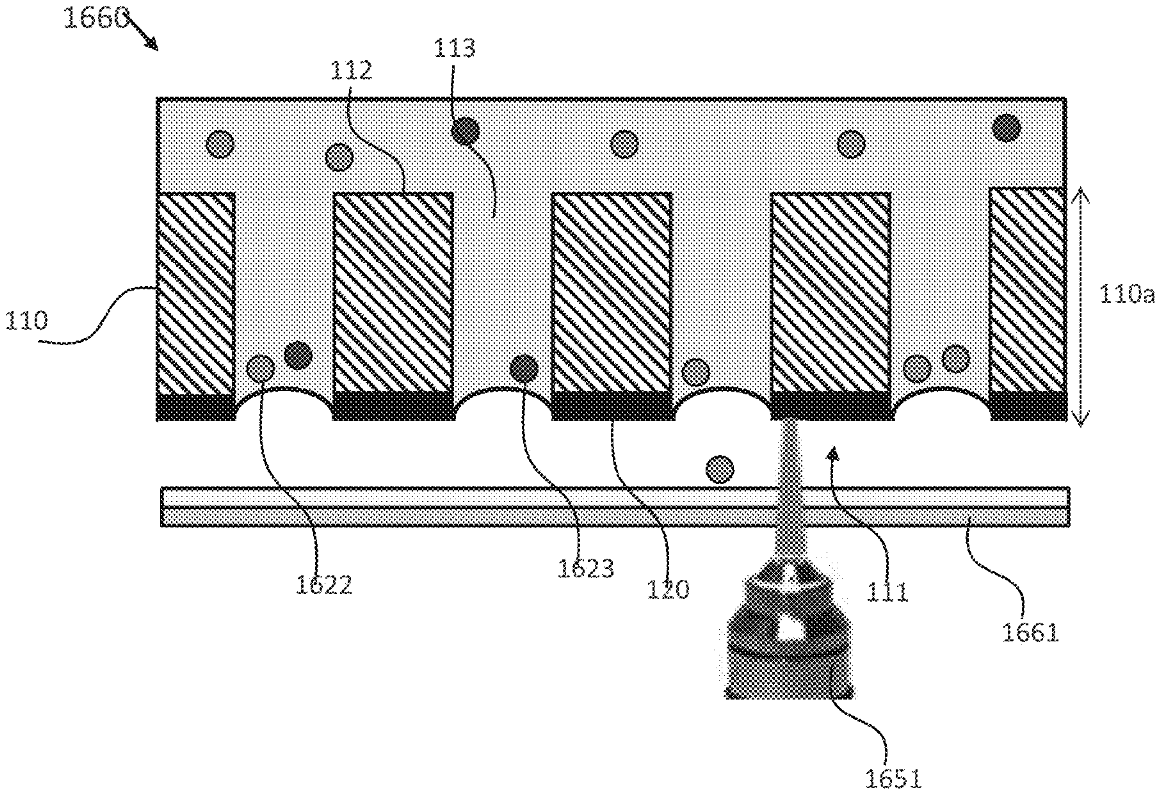
FIG. 16F shows a side cross-sectioned view of collecting the cells, in accordance with some embodiments.

FIG. 16F shows a side cross-sectional view of collecting the cells, in accordance with some embodiments. Per FIG. 16F, the second cells 1623 extracted from the array 100 by the laser 1651 may be collected in the collection tray 1661.

Another aspect provided herein is a method of releasing particles from a pore of an array, the method comprising: filling the pore with at least a portion of a solution, wherein the portion of the solution comprises a particle of interest; holding the portion of the solution in the pore via surface tension; directing electromagnetic radiation at a portion of the array; disrupting the portion of the array, thereby disrupting the surface tension of the portion of the solution held in the pore; and releasing the portion of the solution comprising the particle of interest. In some embodiments, the array comprises a substrate and a coating operably coupled to the substrate. In some embodiments, the substrate comprises a first surface, a second surface opposite the first surface, and the pore, wherein the pore extends from the first surface to the second surface. In some embodiments, the first surface is hydrophilic, and the coating is hydrophobic. In some embodiments, the portion of the array is a coating of the array. In some embodiments, the portion of the array is a coating of the array proximate to the pore. In some embodiments, the coating may comprise one or more metals selected from the group consisting of chromium, titanium, gold, iron, nickel, copper, platinum, and palladium. In some embodiments, the coating may comprise one or more metal layers, each layer independently selected from the group consisting of chromium, titanium, gold, iron, nickel, copper, platinum, palladium, any mixtures thereof, and any alloys thereof. In some embodiments, the coating may comprise a metal layer (such as gold) and an adhesion layer for the metal layer thereunderneath. The adhesion layer for a gold layer, underneath the gold, may comprise chromium, titanium, nickel, or nickel-chromium. In some embodiments, the coating comprises a titanium-gold stack, or a titanium layer. In some embodiments, the array comprises a plurality of pores. In some embodiments, the method further comprises filling the plurality of pores with the solution. In some embodiments, the method further comprises releasing solutions held in a subset of the plurality of pores, wherein the subset of the plurality of pores hold solutions comprising the particle of interest. The method may further comprise analyzing a plurality of fluorescent signatures for each of the particles. In some embodiments, the method further comprises determining the pore holding the portion of the solution comprising the particle of interest based on the analysis. In some embodiments, the particles are released at a rate of about 5,000 to about 100,000,000 particles of interest per second. In some embodiments, the particle of interest comprises a cell. In some embodiments, the cell is released with viability equal to or greater than 60 percent. In some embodiments, the method further comprises receiving the particle of interest in a housing, wherein the housing comprises an internal surface to receive the particle of interest. In some embodiments, the internal surface holds a receiving media. In some embodiments, the receiving media comprises pluoronic F68.

In some embodiments, the method further comprises removing a portion of the surface material from the first or second surface of the array with electromagnetic radiation directed to the surface material within or adjacent to the identified pore, thereby releasing the contents of the identified pore. In some examples, the portion of the surface material may be adjacent to the identified pore. The portion of the surface may comprise a luminal surface of the identified pore. The portion of the surface may be removed to a depth of 100 microns or less. The portion of the surface may be removed to a depth of 50 microns or less.

In some cases, the step of loading the array with a solution comprising the selected contents prior to the identifying the pore with selected contents. In some cases, the step of identifying the pore with selected contents comprises analyzing emitted electromagnetic radiation from the pores of the array. In some case, the step of releasing the contents comprises releasing the contents at a rate of about 5,000 to about 100,000,000 pores per second.

The source of generating electromagnetic radiation may comprise a laser. The laser may be a doped solid state laser. The laser may be a fiber laser. The laser may be a semiconductor diode laser. The laser may be a gas laser, such as a HeNe laser or an eximer laser. The laser may emit electromagnetic radiation within a range of wavelengths. In some embodiments, the electromagnetic radiation may be emitted in the visible and/or infrared. The electromagnetic radiation may be emitted within a 5 nanometer band with then visible or infrared. The electromagnetic radiation may be emitted at a harmonic of a doped solid state laser such as doped Ytterbium Orthovanadate or Ytterbium Aluminum Garnet. The electromagnetic radiation may comprise 1064 nm radiation.

The electromagnetic radiation may be selected from a wavelength of 0.2 microns to 2.5 microns, and a fluence level sufficient to disrupt adhesion between the contents and the pore, and a pulse duration in a range from 1 ns to 1 millisecond.

Accordingly, once particles of interest are identified as being held within a particular pore of the array, electromagnetic radiation can be directed near or adjacent to the particular pore to release the particle of interest. In some embodiments, the disruption of the second surface comprises removing at least a portion of the material of the array, a coating on the array, or both.

In some embodiments, the step of removing a portion of the surface material may be caused by local heating. Such a mechanism may be likely when the pulse duration is longer, the peak power density is lower, and/or the wavelength of the incident radiation is in the infrared. Local heating may cause sublimation of the surface material or of the array material. In some embodiments, the substrate material and the coating comprise different thermal expansion coefficients, which may lead to chipping.

In some cases, the step of removing a portion of the surface material may be caused by ablation. Such a mechanism may be likely when the incident peak power density is higher, the pulse duration is shorter, the incident power is higher, and/or the incident radiation is in the visible. Ablation may comprise local bond breakage and/or vaporization of the array or substrate material.

In some cases, the step of removing a portion of the surface material may be cause by plasma generation. This mechanism may be likely when the pulse duration of the incident radiation is especially short, the wavelength of the incident radiation is resonant with a multi-photon ionization mechanism, and or the wavelength of the incident radiation is very short. Pulse durations on the order of picoseconds to femtoseconds may yield faster plasma generation than local heating leading to optical etching of the substrate or surface mater.

In some cases, the step of removing a portion of the surface material may occur by shock wave generation. Such a mechanism may be more likely when the peak power density is higher, a phonon is resonant, and/or the pulse duration is shorter. Shock may cause physical vibration, chipping, or shaking of the surface or array material.

In some cases, the step of removing a portion of the surface material photochemical removal, such as photoionization. In some cases, the step of removing a portion of the surface material comprises photoacoustic removal, such as by optical generation of a shock wave.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10 percent, 5 percent, or 1 percent, including increments therein.

As used herein, the term "PBMC" refers to a peripheral blood mononuclear cell.

As used herein, the term "orthogonal" refers to a perpendicular arrangement or relationship.

EXAMPLES

The following illustrative examples are representative of embodiments of the software applications, systems, and methods described herein and are not meant to be limiting in any way.

Example 1—Ti—Au Coated Micropore Array Preparation

Glass micropore array (20 μm pore, 60 percent pore coverage) was first sputtered with 100 nm thick titanium (Ti) followed by 500 nm thick gold (Au) (vacuum: 8×10-2 to 2×10-2 mbar, sputtering voltage: 100V to 3 kV, current: 0 to 50 mA). The Ti/Au was sputtered on one side of the pore plate. It should be noted that the Ti/Au can be sputtered on both sides, or any side of the pore plate as described elsewhere herein.

Afterwards, the Ti/Au coated micropore array was soaked with 2 M NaOH solution for 20 minutes, at room temperature. Any residual NaOH was washed off using deionized water (DI) and ethanol and the pore plate was blow dried.

PEG-Silane Coating

Methoxy-Poly (Ethylene-glycol)-Silane (PEG-silane) was dissolved in alcohol at a concentration between 0.1 to 5 g/100 mL. Acetic acid was added into the solution at a volume ratio of 0.1 to 5 mL/100 mL. Dried pore plates from previous step was immersed into the solution, incubate in oven at a temperature between 60 to 80° C. for 10 to 60 mins. The pore plate was then washed off using deionized water (DI) and ethanol and the pore plate was blow dried.

PEG-SH Coating 0.5 g/100 mL Methoxy-Poly (Ethylene-glycol)-Thiol (PEG-SH) was dissolved in anhydrous ethanol (200 proof) with sonication. Dried pore plate from previous step was immersed into the solution, incubate in oven at 30° C. for 1 hour. The pore plate was then washed off using deionized water (DI) and ethanol and the pore plate was blow dried.

Hydrophobic Coating on the Au Side of the Pore Plate

100 μL PF-SH was added to 5 mL 95% ethanol. This solution was then evenly distributed over a 8×8 inch PDMS sheet while the ethanol evaporates. When no liquid was visually detectable on the PDMS sheet, the PDMS sheet (PF-SH side down) was applied on top of the Au side of the pore plate for 5 minutes. The PDMS sheet was then peeled off. The pore plate was left to sit for 10 minutes.

The pore plate was immersed in the PEG-SH coating solution, incubated in the oven at 30° C. for 15 minutes. The pore plate was then washed off using deionized water (DI) and/or ethanol and the pore plate was blow dried using a pressurized air gun.

Example 2—Cassette Assembly

The cassette includes (from top to bottom): a glass sealed to the top of the cassette; an aluminum alloy frame to hold the micropore plate; a receiving glass plate which was spaced at consistent or variable distances from the micropore plate. Receiving media (OptiPEAK T Cell media, InVitria, Junction City, Kans.) with 0.1 percent pluoronic F68 (Cat. 24040032, ThermoFisher Scientific Inc.) of different volume (depending on the cassette size) was added into the receiving plate. The coated micropore array was assembled into the cassette with the coated side facing down (facing the receiving media). Pluoronic F68 addition to receiving media can greatly increase the viability of cells extracted from pores from 0 percent viability to >75 percent viability.

Example 3—Cell Sorting with Coated Micropore Array

PBMCs with density 2 million/mL in OptiPEAK T Cell media were dropped on top of the micropore array and allowed to settle for 5 mins for single cells to be captured at the bottom of the micropores by surface tension. Afterwards, the cassette was mounted on the cell sorter. A laser power from 10-100 percent can be used to extract cells from the micropores. Ti—Au coating at the edges of micropore bottom absorbed IR laser energy and a thin layer of Ti—Au was removed. The meniscus was broken and cells were released from the desired micropores.

Example 4—Manufacture of Agarose Beads with IR Absorbing Core

This procedure describes the preparation of agarose beads with a transparent shell and IR absorbing core.

Step 1. Suspend 50 mg Superdex beads (Superdex 75 100/300 GL, GE Healthcare Life Sciences) into 1 mL acetone. Centrifuge at 2000 rpm to collect Superdex beads. Discard acetone. Make saturated IR absorbing dye (Epolight 1178, Epolin, New Jersey, USA) solution 1 mL in acetone. Centrifuge at 5000 rpm to remove any un-dissolved IR dye. Add IR dye solution into Superdex beads. Incubate at room temperature with constant mixing for 30 mins. Centrifuge the mixture at 1500 rpm. Discard the top liquid. Only save the dark pellet at the bottom. Without further washing by acetone, suspend the resulted dark pellet into 0.2 percent BSA-PBS. This results in uniformly IR dye incorporated Superdex beads.

Step 2. To remove dye from the external portion of the beads, in less than 15 seconds, rinse beads in a 1:1 acetone-water mixture by pipetting. Immediately after, centrifuge the mixture at 1000 rpm for 30 sec, and discard the top liquid. This will result in the IR core structure.

Alternatively, the IR absorbing core can be made by incubating the beads from Step 1 in 0.2 percent BSA-PBS at 4 degree for >5 days. Change buffer 1 time each day. This will slowly dissolve the IR dye from the Superdex beads via molecule diffusion only.

The efficacy of the IR dye microspheres are shown in Table 1, below.

| Bead type | Extraction Efficiency (%) | % Viability (multiple cells) | % Viability (Single cells) |
|---|---|---|---|
| Control (IR dye coated $TiO_2$ bead) | 4 | 48 | 0 |
| Agarose and dextran microsphere | 24 | 27 | 73 |
| Agarose and IR dye microsphere | 51 | 72 | N/A |

The efficacy of the chrome microspheres is shown in Table 2, below.

| Bead type | Extraction (Cells/mm$^2$) | % Viability |
|---|---|---|
| IR Dye Stained Bead #1 | 52 | 105 |
| IR Dye Stained Bead #2 | 10 | 131 |
| Chrome Coated Bead | 9 | 0 |

Example 5—Single PBMC Viability with Pluronic F68 as Media Supplement

The procedure describes a media supplement for enhancing cell viability during cell sorting.

Cells were suspended and harvested in OptiPEAK T Lymphocyte Complete Media (777OPT069) supplemented with 0.1 percent pluronic F68 and 1× penicillin/streptomycin for cell loading and harvesting. In this example, percent viability for each of three samples was measured as, 81 percent, 74 percent, and 65 percent, respectively, for an example array with a 20 μm micropore size.

Example 6—PBMC Extraction

This procedure describes a solution comprising a particle of interest and a bead.

A solution containing human PBMC cells was dropped on top of the micropore array. After 10 mins, single PBMCs were loading into the micropores. Afterwards, solutions containing either control beads (IR dye coated $TiO_2$ beads), or agarose and dextran beads, or agarose and IR dye microspheres were loaded on top of the micropore array. After 15-30 mins, beads were loaded into micropores by gravity. The pore array with cells and beads were mounted on top of receiving reservoir containing cell culture media. IR pulsed laser was directed to target the bottom of the pore where beads were loaded, and cells were extracted into the cell culture media. After extraction, cell culture media containing extracted cells was harvested for viability assay.

Example 7—Cell Viability

This procedure describes determining cell viability.

Cell viability was determined by quantitative sandwich ELISA assay (Human IFN-gamma ELISpot Kit, R&D Systems Inc., No. EL285). The assay employs a capture antibody specific for human cytokine interferon γ(IFN-gamma), pre-coated onto a PVDF-backed microplate. Harvested cells were pipetted directly into the wells and the immobilized antibody in the immediate vicinity of the secreting cells binds secreted human IFN-gamma. Following wash steps and incubation with a biotinylated detection antibody, alkaline-phosphatase conjugated to streptavidin was added. Unbound enzyme was subsequently removed by washing and a substrate solution was added. A blue colored precipitate may form at the sites of cytokine and appeared as spots, with each individual spot representing an individual human IFN-gamma secreting cell. The spots were counted. Standard cell samples of serial dilution with known viable cell numbers were also plated the same way as the harvested cell samples. By counting the blue spots in each well, standard curve was plotted. The number of viable cells in harvested samples was determined by the standard curve.

Figure 19A:
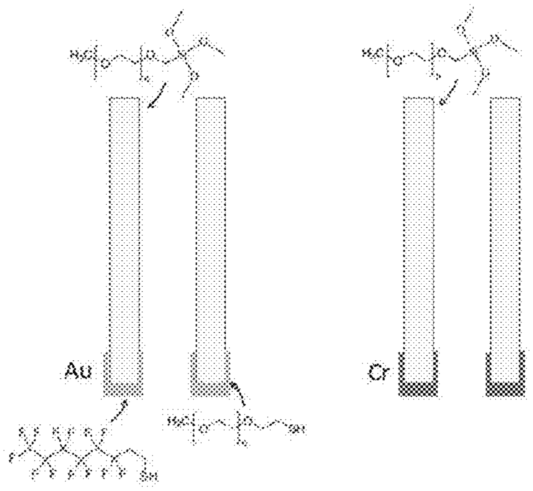
FIGS. 19A-19C show comparisons in performance (extraction yield and cell viability) between a Au-coated pore plate and a Cr-coated pore plate, in accordance with some embodiments.
Figure 19B:
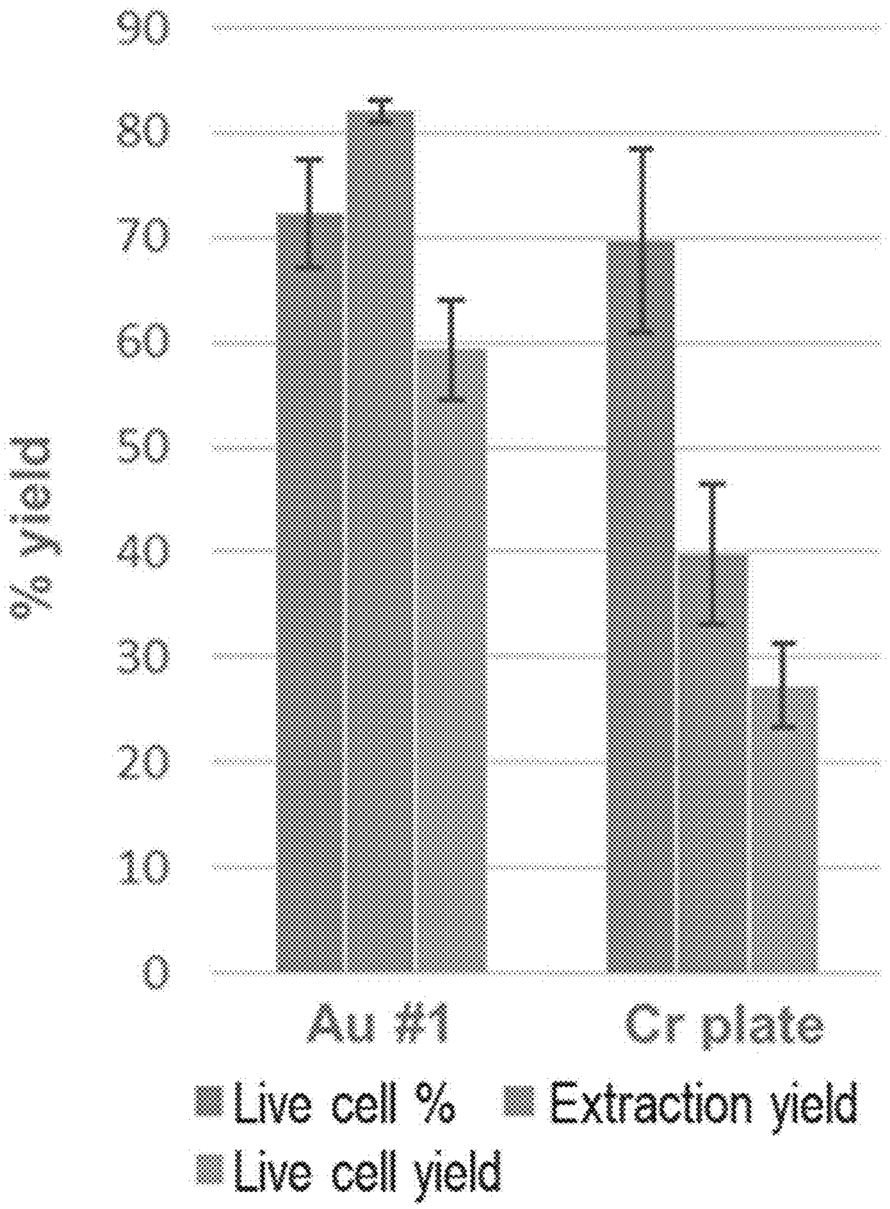
Figure 19C:
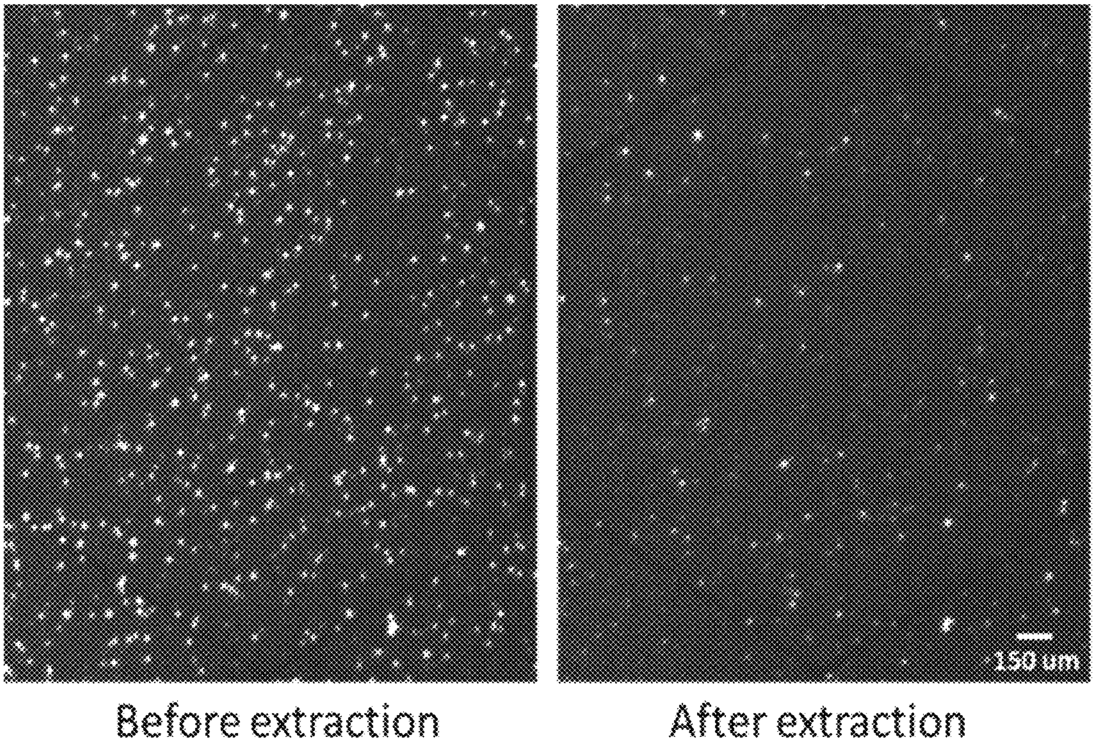

Example 8—Comparisons in Performance (Extraction Yield and Cell Viability) Between Different Coatings FIGS. 19A-19C show comparisons in performance (extraction yield and cell viability) between a Au-coated pore plate and a Cr-coated pore plate. The Au-coated core plate may include the surface modifications described herein with reference to FIGS. 11A-13D. For example, the Au-coated pore plate may comprise the materials described and shown in FIGS. 12B and 13D. Referring to the Au-coated pore array in FIG. 19A, the upper sidewall portions of the pores in the array (glass portion) may be coated with PEG-silane. The lower vertical sidewall portions of the pores in the array may be coated with Au and PEG-thiol. The bottom portion of the array (adjacent to the vertical sidewalls of the pores) may be coated with Au and stamped with Perfluorooctane thiol. Referring to the Cr-coated pore array in FIG. 19A, the bottom portion and bottom vertical sidewalls of the pores of the array may be coated with Cr only, and the upper sidewall portions of the pores in the array (glass portion) may be coated with PEG-silane.

The Au-coated pore plate with the different surface PEG modifications can provide improvements in extraction yield and cell viability over the Cr-coated pore plate. For example, the extraction yield of the Au-coated pore plate is 73%, while the extraction yield of the Cr-coated pore array is 66%. Although the viability of the extracted cells between the Au-coated pore plate and the Cr-coated pore plate is similar (66% versus 68%), the number of viable cells obtained using the Au-coated pore plate is higher than that of the Cr-coated pore plate, since the Au-coated core plate has a higher extraction yield compared to the Cr-coated pore plate.

FIG. 19B shows another example of the yields between the Au-coated pore plate and Cr-coated pore plate. Extraction yield and cell viability, as well as total live cell yield is improved with Ti—Au-PEG coated pore plates. Peripheral blood mononuclear cell (PBMCs) stained with CD4/8-APC T cell markers were loaded on the Au-coated and Cr-coated plates, and were extracted to compare their extraction yield and viability by dye exclusion. Comparing to chemically coated Au plates, Cr plate that are PEG-Silane coated only showed high dye-exclusion based viability, but extraction yield was not able to improve given its laser power limitation. The overall yield (i.e. extraction yield and viability) of a Cr-coated plate appeared to be much lower than Au-coated plates. FIG. 19C show extraction yield images from a full plate coated with Ti—Au-PEG and hydrophobic coatings (bright dots are cells stained with fluorescent antibodies under fluorescent imaging). As shown in FIG. 19C, a comparison of the images before and after extraction show a high extraction yield that is consistent with the above quantitative results.

Example 9—Contact Angle Images and Measurements for Different Coatings

Figure 20:
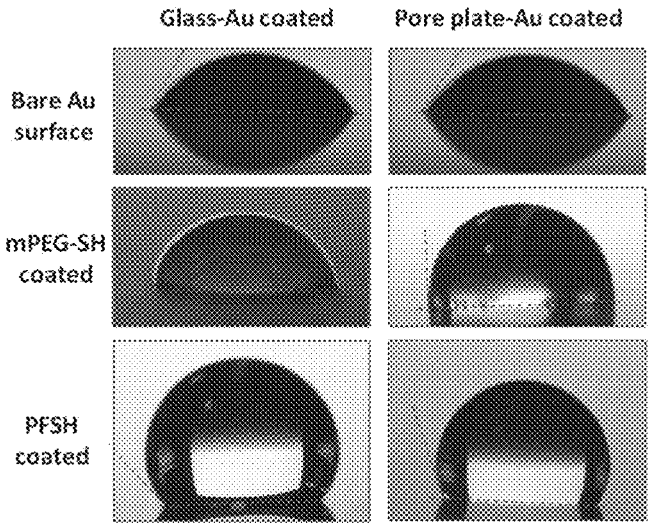
FIG. 20 shows contact angle images and measurements for different coatings, in accordance with some embodiments.

FIG. 20 shows images and contact angle measurements for a bare Au surface, mPEG-SH coated surface, and a PF-SH coated surface. The images and measurements were taken on a glass plate, and on a pore plate. As shown in FIG. 20, different surface coatings can be used to modify the wetting behavior to liquids. For example, a hydrophobic coating can be formed on the bottom of pore plate (e.g. by stamping PF-SH on the bottom portion of the array) to prevent leakage from the pores, and to form a meniscus that is sufficient to hold the liquid and particles within the pores.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. An array comprising:

a substrate with a first surface and a second surface opposite to the first surface, wherein the substrate comprises a plurality of pores defining lumens extending from the first surface to the second surface, and wherein the plurality of pores is configured to receive a sample solution comprising a plurality of particles; and a surface material provided at or adjacent to the first or second surfaces, wherein the surface material comprises a plurality of materials that are configured to modify a wetting behavior of the sample solution or the plurality of particles at or adjacent to said first or second surfaces, such that one of the first or second surfaces is hydrophilic, and the other of the first or second surfaces is hydrophobic, and wherein a particle extraction yield of the array is at least 70%.

2. The array of claim 1, wherein the second surface is configured to receive the sample solution comprising the plurality of particles.

3. The array of claim 1, wherein:

each pore of the plurality of pores has a largest diameter of 500 microns or less, and/or each pore of the plurality of pores has an aspect ratio of 10 or greater.

4. The array of claim 1, wherein the substrate has a pore density of 100 or greater pores per square millimeter.

5. The array of claim 1, wherein the plurality of materials comprises a functionally modified surface layer, wherein said functionally modified surface layer is optionally a hydrophobicity modified surface layer, a hydrophobicity modified surface layer, or a combination thereof; or wherein said functionally modified surface layer is optionally a chemically coated metal layer.

6. The array of claim 5, wherein the functionally modified surface layer comprises titanium, gold, or titanium and gold.

7. The array of claim 5, wherein the plurality of particles comprises live cells, and wherein a live cell extraction yield of the array having the functionally modified surface layer is at least 5% higher than another array without the functionally modified surface layer.

8. The array of claim 5, wherein the plurality of materials further comprises a chemical coating that is not on the functionally modified surface layer.

9. The array of claim 8, wherein the chemical coating is provided on one or more portions of the substrate or the plurality of pores that does not have the functionally modified surface layer, and/or wherein the chemical coating comprises Methoxy-Poly (Ethylene-glycol)—Silane.

10. The array of claim 5, wherein the first surface is configured to be disrupted to release one or more of the particles from one or more of the pores.

11. The array of claim 10, wherein:

the second surface is hydrophilic to enhance absorption of the sample solution comprising the plurality of particles into the plurality of pores and/or the first surface is hydrophobic to reduce or eliminate unwanted leakage of the sample solution from the pores; and/or the first surface is configured to be disrupted by directing electromagnetic radiation at one or more portions of the second surface.

12. The array of claim 5, wherein a particle extraction yield of the array having the functionally modified surface layer is higher than another array without the functionally modified surface layer.

13. The array of claim 12, wherein the particle extraction yield of the array having the functionally modified surface layer is at least 5% higher than the another array without the functionally modified surface layer.

14. The array of claim 5, wherein a first portion of the functionally modified surface layer is coated with a first chemical coating, and a second portion of the functionally modified surface layer is coated with a second chemical coating that is different from the first chemical coating.

15. The array of claim 14, wherein: the first chemical coating comprises Methoxy-Poly (Ethylene-glycol)-Thiol, and/or the second chemical coating comprises 1H,1H,2H,2H-Perfluorodecanethiol.

16. The array of claim 14, wherein the first chemical coating is provided on vertical sidewalls of the plurality of pores at or adjacent to the first or second surfaces and is configured to reduce or eliminate sticking of the particles to the vertical sidewalls of the pores, and/or wherein the second chemical coating is hydrophobic and is configured to reduce or prevent unwanted leakage of the sample solution from the pores.

17. The array of claim 16, wherein the second chemical coating is provided on a portion of the substrate that is at or adjacent to the first or second surfaces, and/or wherein the portion of the substrate is adjacent to vertical sidewalls of the plurality of pores, and/or wherein the portion of the substrate is substantially orthogonal to the vertical sidewalls of the plurality of pores.

18. An array comprising:

a substrate with a first surface and a second surface opposite to the first surface, wherein the substrate comprises a plurality of pores defining lumens extending from the first surface to the second surface, and wherein the plurality of pores is configured to receive a sample solution comprising a plurality of particles; and a surface material provided at or adjacent to the first or second surfaces. wherein the surface material comprises a plurality of materials that are configured to modify a wetting behavior of the sample solution or the plurality of particles at or adjacent to said first or second surfaces, such that one of the first or second surfaces is hydrophilic, and the other of the first or second surfaces is hydrophobic, wherein the surface material is selected from a material that absorbs greater than 10 percent of incident electromagnetic radiation.

19. An array comprising:

a substrate with a first surface and a second surface opposite to the first surface, wherein the substrate comprises a plurality of pores defining lumens extending from the first surface to the second surface, and wherein the plurality of pores is configured to receive a sample solution comprising a plurality of particles; and a surface material provided at or adjacent to the first or second surfaces, wherein the surface material comprises a plurality of materials that are configured to modify a wetting behavior of the sample solution or the plurality of particles at or adjacent to said first or second surfaces, such that one of the first or second surfaces is hydrophilic, and the other of the first or second surfaces is hydrophobic, wherein the plurality of materials comprises a functionally modified surface layer that has a thickness within a range of about 50 nm to about 1 mm.

* * * * *